(12) United States Patent
Sun et al.

(10) Patent No.: US 11,636,460 B2
(45) Date of Patent: Apr. 25, 2023

(54) ELECTRONIC DEVICE, METHOD AND COMPUTER READABLE RECORDING MEDIUM FOR ELECTRONIC TRANSACTION

(71) Applicant: LINE Corporation, Tokyo (JP)

(72) Inventors: Yun-Ru Sun, Tokyo (JP); Chien-Wei Hu, Tokyo (JP); Yu-Chuan Wei, Tokyo (JP); Li-Wen Liao, Tokyo (JP)

(73) Assignee: LINE CORPORATION, Tokyo (JP)

( * ) Notice: Subject to any disclaimer, the term of this patent is extended or adjusted under 35 U.S.C. 154(b) by 39 days.

(21) Appl. No.: 17/140,304

(22) Filed: Jan. 4, 2021

(65) Prior Publication Data

US 2021/0209578 A1 Jul. 8, 2021

(30) Foreign Application Priority Data

Jan. 2, 2020 (CN) .............................. 202010000631
Mar. 17, 2020 (KR) ........................ 10-2020-0032860

(51) Int. Cl.
*G06Q 20/32* (2012.01)
*G06F 3/04883* (2022.01)
*G06F 3/0482* (2013.01)
*G06Q 20/38* (2012.01)

(52) U.S. Cl.
CPC ....... *G06Q 20/326* (2020.05); *G06F 3/04883* (2013.01); *G06F 3/0482* (2013.01); *G06Q 20/381* (2013.01)

(58) Field of Classification Search
CPC ... G06Q 20/306; G06Q 20/381; G06Q 20/326

USPC .......................................................... 705/39
See application file for complete search history.

(56) References Cited

U.S. PATENT DOCUMENTS

| | | | |
|---|---|---|---|
| 10,614,512 B1* | 4/2020 | Ogborn | G06F 3/017 |
| 10,853,791 B1* | 12/2020 | Ellis | G06Q 20/4012 |
| 11,079,919 B1* | 8/2021 | Soccorsy | G06Q 20/14 |
| 11,182,776 B1* | 11/2021 | Bhos | G06Q 20/389 |
| 11,361,300 B1* | 6/2022 | Kurani | G06Q 20/3672 |
| 2016/0224973 A1* | 8/2016 | Van Os | G06Q 20/3276 |
| 2017/0011398 A1* | 1/2017 | Narasimhan | G06Q 20/108 |
| 2017/0124540 A1* | 5/2017 | Chan | G06Q 20/204 |
| 2018/0315051 A1* | 11/2018 | Hurley | G06Q 20/3255 |
| 2018/0365024 A1* | 12/2018 | Kiriakou | G07G 1/01 |
| 2019/0370781 A1* | 12/2019 | Van Os | G06F 21/35 |

(Continued)

OTHER PUBLICATIONS

"M-Payments Issues and Concepts," by Cristian Toma. Informatica Economica. vol. 16, No. 12. 2012 pp. 117-125. (Year: 2012).*

*Primary Examiner* — Sara C Hamilton
(74) *Attorney, Agent, or Firm* — Harness, Dickey & Pierce, P.L.C.

(57) ABSTRACT

The present disclosure relates to an electronic device, a method, and a computer-readable recording medium for electronic transactions. The electronic device displays a first graphical user interface (GUI) on a touch screen, the first GUI including a currency amount, displays a second GUI corresponding to transmission of the currency amount according to a currency transmission signal input to the touch screen, determines an amount of an electronic transaction according to the currency transmission signal, and transmits a generated signal containing information on the amount of the electronic transaction to an information processing system.

18 Claims, 24 Drawing Sheets

(56) References Cited

U.S. PATENT DOCUMENTS

| | | | |
|---|---|---|---|
| 2020/0028753 A1* | 1/2020 | Powar | H04W 4/08 |
| 2020/0042158 A1* | 2/2020 | Skarda | G06F 3/04883 |
| 2020/0233568 A1* | 7/2020 | Wang | G06F 3/0486 |
| 2020/0302519 A1* | 9/2020 | Van Os | G06F 16/24 |

* cited by examiner

ELECTRONIC DEVICE, METHOD AND COMPUTER READABLE RECORDING MEDIUM FOR ELECTRONIC TRANSACTION

CROSS-REFERENCE TO RELATED APPLICATION

This application claims priority under 35 U.S.C § 119 to Chinese Patent Application No. 202010000631.9 filed in the China National Intellectual Property Administration on Jan. 2, 2020, and Korean Patent Application No. 10-2020-0032860 filed in the Korean Intellectual Property Office on Mar. 17, 2020, the entire contents of both of which are hereby incorporated by reference.

TECHNICAL FIELD

The present disclosure relates to an electronic device, a method, and a computer-readable recording medium for electronic transactions, and more particularly, to an electronic device, a method, and a computer-readable recording medium having a payment detection function.

BACKGROUND

Electronic transactions are performed using electronic devices. Specifically, a user completes an electronic transaction (e.g. payment, transfer or wire transfer) with a merchant, or an individual, through mobile payment software installed on the electronic device. Electronic transactions are convenient because such transactions are performed without handling physical currency.

In the related art, when checking whether or not to proceed with an electronic transaction, there is no relevant processing mechanism is provided to delay the process of such electronic transaction, or cancel such electronic transaction, other than providing an interface with a final confirmation message to the user before completing the electronic transaction.

SUMMARY

In view of the deficiencies of the related art described above, some embodiments provide an electronic device having a payment detection function, a method, and a computer-readable recording medium storing instructions.

The present disclosure provides a method for electronic transaction for an electronic device, which may include displaying a first graphical user interface (GUI) on a touch screen, the first GUI including a currency amount, displaying a second GUI corresponding to transmission of the currency amount according to a currency transmission signal input to the touch screen, determining an amount of an electronic transaction according to the currency transmission signal, and transmitting a generated signal containing information on the amount of the electronic transaction to an information processing system.

In some embodiments, the first GUI includes a currency image of at least one of a bill or a coin, the currency image corresponding to the currency amount.

In some embodiments, the currency transmission signal includes a touch signal received by the touch screen.

In some embodiments, the touch signal includes at least one of a click touch signal or a drag touch signal.

In some embodiments, the second GUI includes a dynamic currency image of a bill or a coin, the dynamic currency image corresponding to the currency amount.

In some embodiments, the method for electronic transaction may further include displaying a third GUI corresponding to conversion of the currency amount into a different currency unit.

In some embodiments, the method for electronic transaction may further include outputting at least one of a sound generated by a speaker, a vibration generated by a vibrator, or a visual effect on the touch screen contemporaneous with the displaying the second GUI.

In some embodiments, the determining the amount of the electronic transaction includes calculating the amount of the electronic transaction based on a face value of the currency amount.

In some embodiments, the currency amount is related to a balance of an electronic wallet.

In some embodiments, the method for electronic transaction may further include receiving a signal containing payment information, the payment information including an amount of income, and the currency amount being related to the payment information.

The present disclosure further provides an electronic device for executing an electronic transaction, which may include a touch screen and processing circuitry. The processing circuitry may be configured to cause the electronic device to display a first graphical user interface (GUI) on a touch screen, the first GUI including a currency amount, display a second GUI corresponding to transmission of the currency amount according to a currency transmission signal input to the touch screen, determine an amount of an electronic transaction according to the currency transmission signal, and transmit a generated signal containing information on the amount of the electronic transaction to an information processing system.

The present disclosure further provides a computer-readable recording medium for electronic transaction having a plurality of executable program instructions, and when the executable program is embedded on the electronic device, the electronic device executes the operations of the method described above.

BRIEF DESCRIPTION OF THE DRAWINGS

The scheme of the present disclosure will be best understood by referring to the following detailed description with reference to the accompanying drawings. It should be noted that the various features are not drawn in proportion, and in fact, for the clarify of the description, the sizes of the various features are arbitrarily enlarged or reduced.

DETAILED DESCRIPTION

Figure 1:
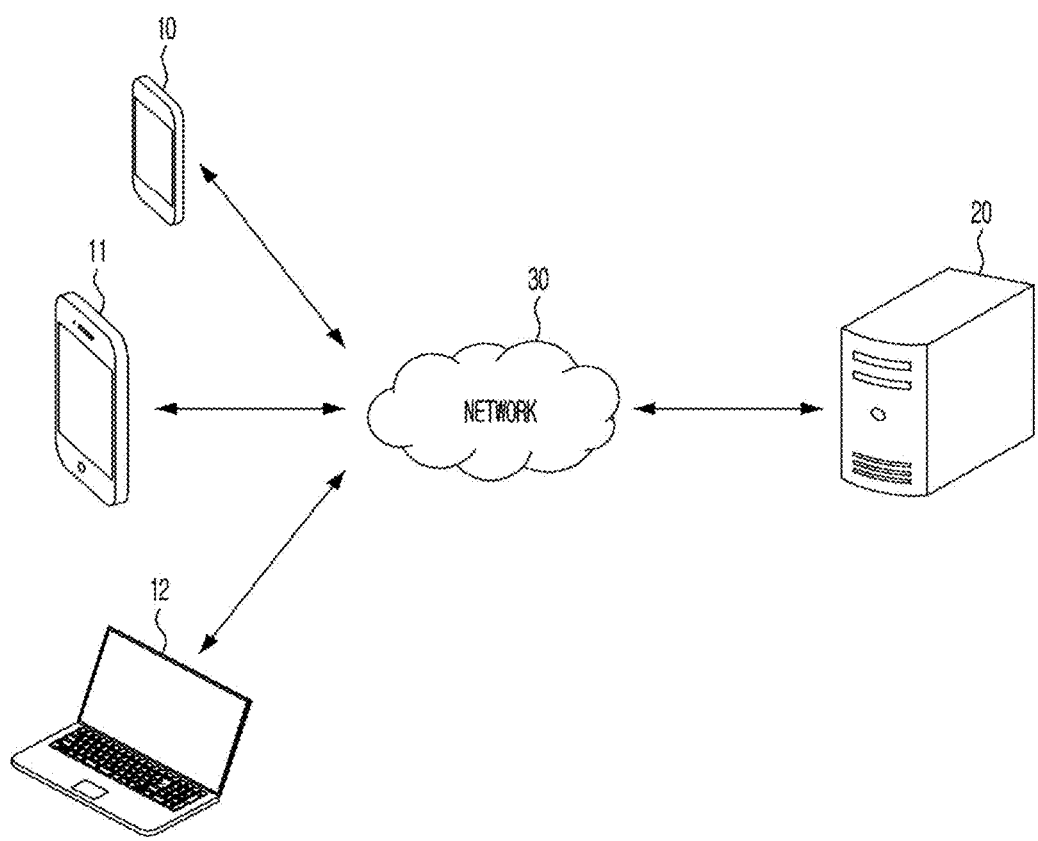
FIG. 1 is an explanatory diagram illustrating a network environment according to some embodiments.

Hereinafter, in order to make the technical solutions and advantages of some embodiments of the present disclosure more clear, a technical solution in some embodiments of the present disclosure will be described clearly and completely with reference to the accompanying drawings of the present disclosure. It is apparent that the described examples are merely some embodiments of the present disclosure. Based on the examples of the present disclosure, some embodiments obtainable by those skilled in the technical field of the present disclosure without creative efforts are all within the claims of the present disclosure.

In the following detailed description, the accompanying drawings for describing some embodiments of the present application may be referenced, which are included as part of the present application. In the accompanying drawings, similar reference numerals describe generally similar elements in other drawings. Some embodiments of the present application will be described in sufficient detail below so that those skilled in the art having related knowledge and technology in the technical field of the present disclosure may implement the technical solution of the present application. It is to be understood that structural, logical, or electrical changes may be implemented with respect to some embodiments of the present application.

Hereinafter, some embodiments of the present disclosure will be described in more detail. However, the present disclosure provides a concept capable of implementing various applications in a wide range and in a variety of specific environments. Some embodiments are for illustrative purposes only and are not intended to limit the scope of the present disclosure.

In the related art, there is no corresponding processing mechanism for delaying an electronic transaction process or canceling electronic transaction when the user incorrectly touches or makes an incorrect decision at the time of confirming an electronic transaction. Accordingly, the present disclosure provides an electronic device, a method, and a computer-readable recording medium having a payment detection function. According to some embodiments, a method for electronic transaction for an electronic device having a payment detection function may display a first graphic presentation of a currency on a touch screen of the electronic device, and when the touch screen detects a signal for operating the currency transmission, display a second graphic presentation for transmitting the corresponding currency. In addition, according to the signal for currency transmission, the electronic device may determine an amount of electronic transaction related thereto and transmit information on the amount of electronic transaction to the information processing system to perform the electronic transaction according to the amount. As described above, according to some embodiments, it may be possible to prevent the user from erroneously completing the electronic transaction related to the currency, or reduce the occurrence thereof, by delaying the transmission or payment operation of the corresponding currency through the graphic presentations of various graphic user interfaces (GUIs) provided by the electronic device.

In the present disclosure, "currency" may refer to a distribution means or payment means used for electronic transactions executed by an electronic device. In some embodiments, the currency may include real money (e.g., bills, coins or coinages, gift certificates, and/or the like) or virtual money (e.g., electronic money, electronic coupons, electronic gift certificates, cryptocurrencies, and/or the like) used for electronic transactions or commercial distribution, but is not limited thereto, and may include other types of distribution means or payment means in either physical or electronic form.

In the present disclosure, "transmission" of the currency may mean a change of a representation of the currency, a movement of the currency, a payment, a transfer, a deposit, a withdrawal (or draw) in the currency, and/or the like, which may be executed by electronic media or computer programs for electronic transactions executed by the electronic devices. For example, the currency transmission may be performed in the form of a certain amount of currency being transmitted from an electronic wallet implemented by an electronic device to another electronic device (or an electronic wallet of the electronic device).

FIG. 1 is an explanatory diagram illustrating a network environment according to some embodiments. Specifically, the network environment illustrated in FIG. 1 includes a plurality of electronic devices 10, 11, and/or 12, at least one information processing system 20, and/or a network 30 connecting the electronic devices 10, 11, 12 and/or the information processing system 20. Here, FIG. 1 illustrates an example of a network environment of the present disclosure, and the number of electronic devices or information processing systems is not limited to the number illustrated in FIG. 1.

The electronic devices 10, 11, and/or 12 may be implemented as, through a computer system, a fixed terminal device and/or a mobile terminal device. Specifically, the electronic devices 10, 11, and/or 12 may be smart phones, mobile phones, navigation devices, computers, notebook computers, tablet computers, personal digital assistants (PDAs), portable media players (PMPs), game consoles, wearable devices, Internet of Things (IoT) devices, Virtual Reality (VR) devices, Augmented Reality (AR) devices, and/or the like.

In some embodiments, as illustrated in FIG. 1, the electronic device 10 is a smart phone, for example. In some embodiments, the electronic device 10 may be one of various computer systems communicating with other electronic devices 11 and/or 12, and/or the information processing system 20, through the network 30 by a wired and/or wireless communication method.

In some embodiments, the network 30 may include one or more networks such as a personal area network (PAN), a local area network (LAN), a campus area network (CAN), a metropolitan area network (MAN), a wide area network (WAN), a broadband network (BBN), the Internet, and/or the like.

In some embodiments, the network topology structure of the network 30 may include at least one of a bus-type network, a star network, a ring-type network, a mesh network, a radial bus network, a tree type and/or a hierarchical network, although the network 30 is not limited thereto. On a separate note, the communication method is also not limited, and in addition to the communication using the network 30, the electronic devices may communicate with each other through short-range wireless communication.

The information processing system 20 may be implemented with at least one computer device (e.g., a network server), and may communicate with the electronic devices 10, 11, and/or 12 through the network 30 to provide services such as instructions, program codes, files, contents, and/or the like. For example, the information processing system 20 may be a system that provides a network service, and may provide the network service to the electronic devices 10, 11, and/or 12 connected through the network 30. More specifically, the electronic devices 10, 11, and/or 12 may be installed with applications (e.g., applications implementing real-time communication, electronic transaction functions, electronic wallet management functions, and/or the like) related to a network service provided by the information processing system 20, and in this way, the information processing system 20 may provide the network service to the electronic devices 10, 11, and/or 12 through the application executed on the electronic devices 10, 11, and/or 12.

Figure 2:
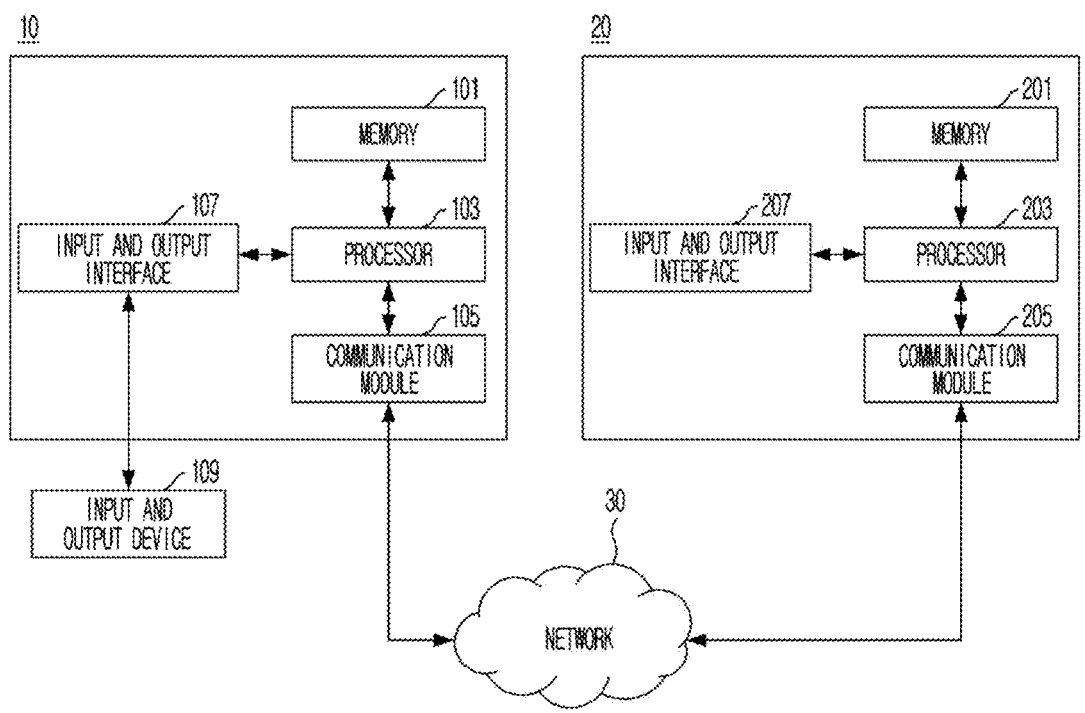
FIG. 2 is a block diagram illustrating an electronic device and a server according to some embodiments.

FIG. 2 is a block diagram illustrating an internal structure of the electronic device and the information processing system according to some embodiments. Here, although FIG. 2 illustrates only the internal structures of the electronic device 10 and the information processing system 20, the other electronic devices 11 and/or 12 may also have the same internal structure as, or a similar internal structure to, the electronic device 10.

In some embodiments, the electronic device 10 may include a memory 101, a processor 103, a communication module 105 and/or an input and output interface 107. The information processing system 20 may include a memory 201, a processor 203, a communication module 205, and/or an input and output interface 207. In some embodiments, the memory 101, 201 may be a computer-readable recording medium, and include a permanent mass storage device such as a random access memory (RAM), a read only memory (ROM), a disk drive, a solid state drive (SSD), a flash memory, and/or the like.

In some embodiments, the permanent mass storage device, such as the ROM, SSD, flash memory, disk drive, and/or the like, may be a separate permanent storage device different from the memory 101, 201, and may be installed separately from (e.g., external to) the electronic device 10 and/or the information processing system 20. In some embodiments, the memory 101, 201 may store an operating system (OS) and at least one program code (e.g., a program code of an application installed in the electronic device 10 for implementing a browser of the electronic device 10, an electronic transaction function, an electronic wallet management service, and/or the like).

In some embodiments, an element related to the software described above may be loaded from a computer-readable recording medium independent of the memory 101, 201. Such a computer-readable recording medium may include a computer-readable recording medium such as a floppy disk drive, a magnetic disk, a magnetic tape, a DVD/CD-ROM driver, a memory card, a USB device, and/or the like. In some embodiments, the software-related element may be received through the communication module 105, 205 (e.g., transmitter, receiver, transceiver, etc.) and loaded in the memory 101, 201. For example, the software-related element may be provided to the electronic device 10 through the network 30 by a developer or an issuing system for issuing software, and after the electronic device 10 receives the software-related element through the communication module 105, it may be loaded and executed by the processor 103 in cooperation with the memory 101.

In some embodiments, the processor 103, 203 may process the instruction of a computer program through execution of basic operations, logic, and input and output calculations. The instruction may be provided to the processor 103, 203 through the memory 101, 201 or the communication module 105, 205. For example, the processor 103, 203 may execute the instruction of the recording device program code stored in the memory 101, 201, and/or execute the instruction of the program codes received from the communication module 105, 205.

In some embodiments, the communication module 105, 205 may, through the network 30, complete a function of communicating the electronic device 10 and the information processing system 20 to each other, or complete a function of communicating the electronic device 10 and another electronic device (e.g., the electronic device 11) to each other. For example, the processor 103 of the electronic device 10 may transmit a request generated upon executing the program code stored in the memory 101 to the information processing system 20 through the network 30 using the communication module 105.

Upon executing the control signals, instructions, contents, files, and/or the like generated by the program code, the processor 203 of the information processing system 20 may transmit them to the electronic device 10 through the network 30 using the communication module 205. In some embodiments, the electronic device 10 may use the communication module 105 to transmit the received control signals, instructions, contents, files, and/or the like of the information processing system 20 to the processor 103 and/or the memory 101 for processing, and store the contents, files, and/or the like in the storage medium (the permanent storage device as described above) of the electronic device 10.

In some embodiments, the input and output interface 107 may be an interface unit for connecting to the input and output device 109. By way of example, the input device of the input and output device 109 may include a device such as a keyboard, a mouse, a microphone, a camera, and/or the like. The output device of the input and output device 109 may include a device such as a monitor, a speaker, a vibrator, a haptic feedback device, and/or the like.

In some embodiments, the input and output device 109 may be a touch screen having both output and input functions, and the input and output interface 107 may be an interface unit between the touch screen and the electronic device 10. In an example, the input and output device 109 and the electronic device 10 may be configured as one device. Similarly, the input and output interface 207 of the information processing system 20 may be an interface unit connecting the information processing system 20 and an external input and output device (not illustrated), or an interface unit connected to an input and output device (not illustrated) included in the information processing system 20.

In some embodiments, in processing the computer program instructions loaded in the memory 101, the processor 103 of the electronic device 10 may configure a service screen or content with the data provided by the information processing system 20 or the electronic device 11, and display the result on a screen through the input and output interface 107.

In some embodiments, the electronic device 10 and the information processing system 20 may include more components than the components of FIG. 2, but as some of these are components known in the related art, they may not be clearly illustrated. For example, the electronic device 10 may include at least a part of the input and output device 109, or may include other components such as a transceiver, a global positioning system (GPS) module, a camera lens, various sensors, a database, and/or the like.

More specifically, when the electronic device 10 is a smart phone, the electronic device 10 may include various components such as an acceleration sensor, a gyro sensor, a camera lens module, various physical buttons, buttons using a touch panel, input and output ports, a vibrator for vibration, a speaker for emitting sound, and so on, which are commonly provided in the smart phone.

In some embodiments, the processor 103 of the electronic device 10 may be regarded as a component or a module, and the component or the module of the processor 103 may implement, and/or be regarded as, different functions when the processor 103 executes the corresponding program code instructions stored in the memory 101. In some embodiments, the components or modules of the processor 103 may optionally be included in the processor 103 or may be omitted from (e.g., external to) the processor 103. In some embodiments, the components or modules of the processor 103 may have functions provided individually or in combination according to the situation.

In some embodiments, the electronic device 10 may include an electronic transaction system implemented by a computer. For example, the electronic transaction system described above may be implemented as an application that is independently executed, and/or the electronic transaction system may be implemented as an in-app of a specific application and may operate based on the specific application. In some embodiments, the electronic device 10 may provide an electronic transaction service through interworking with the information processing system 20.

According to the technology of the present disclosure, through the electronic device and the method having the payment detection function, the user may perform an operation related to the transaction through a delay in a graphic interface, thereby preventing the user from erroneously completing the electronic transaction or reducing the occurrence thereof. It is to be noted that the electronic transaction GUI illustrated in the drawings to be described below is merely an example, and it is not intended to limit the technology of the present disclosure to the illustrated aspect, and all operation interfaces of the electronic transaction service are applicable as long as the operation interface is capable of interworking with a back-end network (e.g., the information processing system 20). Hereinafter, some embodiments of the electronic device and the method having the payment detection function will be described in detail.

Figure 3:
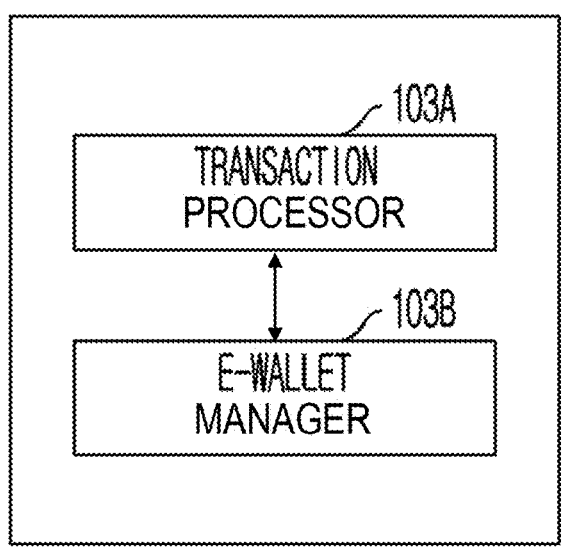
FIG. 3 is a block diagram illustrating a processor of an electronic device according to some embodiments.

FIG. 3 is a block diagram of a processor of the electronic device according to some embodiments. Specifically, as illustrated in FIG. 3, the processor 103 of the electronic device 10 may include at least one transaction processor 103A and/or an electronic wallet manager 103B. The transaction processor 103A may execute the electronic transaction function after the processor 103 executes the corresponding program code instructions stored in the memory 101, and the electronic wallet manager 103B may execute the electronic wallet management function after the processor 103 executes the corresponding program code instructions stored in the memory 101.

Figure 4:
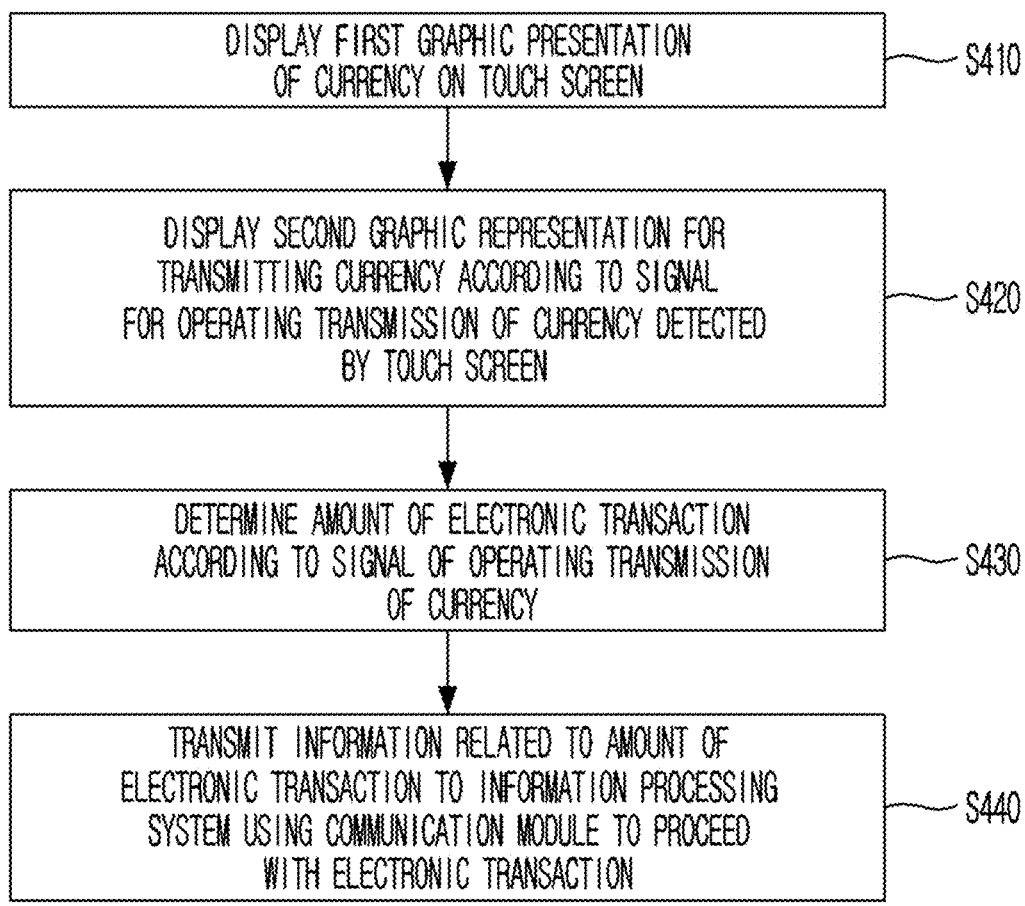
FIG. 4 is a flowchart of a method that may be executed by an electronic device according to some embodiments.

FIG. 4 is a flowchart of a method for electronic transaction which may be executed by the electronic device according to some embodiments. In some embodiments, based on the execution of the instructions provided by the application installed in the electronic device 10, an electronic transaction system may be implemented in the electronic device 10 to execute the method for electronic transaction illustrated in FIG. 4. Specifically, after the processor 103 executes the OS and/or the related program code instructions stored in the memory 101, the transaction processor 103A and/or the electronic wallet manager 103B may execute operations S410, S420, S430, and/or S440 included in the method 400 for electronic transaction of FIG. 4.

In other words, at the start of the method 400, the processor 103 may read the corresponding program code instructions already loaded in the memory 101 from the memory 101, and such program code instructions include program code instructions that cause the transaction processor 103A and/or the electronic wallet manager 103B to execute operations S410, S420, S430, and/or S440.

In some embodiments, when a user intends to conduct an electronic transaction using the electronic device 10 on which the electronic transaction application is installed, the user operates a related function through the electronic device 10. Specifically, when the user operates the electronic transaction application through the electronic device 10 to perform the currency transmission (e.g., transfer or wire transfer) function (e.g., in response to receiving a financial transaction request from the user), the electronic wallet manager 103B of the processor 103 may execute operation S410 to display a first graphic presentation (e.g., first GUI) of a currency (e.g., a currency amount) on the display (e.g., touch screen) of the electronic device 10. In some embodiments, the first graphic presentation of the currency may include an image (e.g., a currency image) of at least one of a bill or a coin corresponding to the currency.

In some embodiments, when the currency transmission function is for the user to pay a cost, the first graphic presentation of the currency is related to (e.g., includes) the balance of the electronic wallet, that is, the first graphic presentation of the currency represents the balance of the electronic wallet. In some embodiments, when the currency transmission function is for the user to receive information (e.g., receive a signal containing payment information) from the information processing system 20 using the electronic device 10, in which the information is about the payment made by another user using another device (e.g., using the electronic device 11), the first graphic presentation of the currency is related to the amount of income according to the payment information, that is, the first graphic presentation of the currency represents the amount of income according to the payment information.

Then, when the user operates the currency transmission operation through the electronic device 10 (e.g., the touch screen of the electronic device 10), that is, when the electronic device 10 (e.g., the touch screen) detects an operation signal for currency transmission (e.g., a currency transmission request from the user), the electronic wallet manager 103B of the processor 103 may execute operation S420 to display a second graphic presentation (e.g., second GUI) of transmitting the currency on the touch screen according to the operation signal for currency transmission (may also be referred to herein as a currency transmission signal). In some embodiments, when the user touches the first graphic presentation of the currency displayed on the touch screen to operate the currency transmission, the operation signal for currency transmission detected by the touch screen is a touch signal.

In some embodiments, the user may operate the currency transmission by clicking a button of a specific GUI on the touch screen. In this case, the touch signal for operating the currency transmission detected by the touch screen may be a click touch signal. The electronic wallet manager 103B of the processor 103 may automatically display a second graphic presentation of transmitting the currency according to the click touch signal. Here, the second graphic presentation of transmitting the currency may include a dynamic image (e.g., animation and/or video) of one of a bill or a coin corresponding to the currency. For example, the dynamic image (e.g., a dynamic currency image) included in the second graphic presentation of transmitting the currency may be a dynamic image of moving the bill or the coin corresponding to the currency from a first area to a second area of a screen of the display of the electronic device 10 (e.g., the touch screen). According to some embodiments, the dynamic image may be displayed for a particular duration. The particular duration may be a design parameter determined through empirical study. During the particular duration, the user may cancel and/or modify the electronic transaction.

In some embodiments, the user may operate the currency transmission by dragging the first graphic presentation of the currency on the touch screen. At this time, the touch signal from operating the currency transmission detected by the touch screen is a drag touch signal. The electronic wallet manager 103B of the processor 103 may display a second graphic presentation of transmitting the currency according to the drag touch signal. Here, the second graphic presentation of transmitting the currency may include a dynamic image of at least one of the bill or the coin corresponding to the currency. For example, the dynamic image included in the second graphic presentation of transmitting the currency may be a dynamic image of moving the bill or the coin corresponding to the currency from the first area to the second area of the touch screen according to the drag operation of the user.

In some embodiments, the user may click another button of the GUI on the touch screen, and at this time, the touch screen detects the corresponding click touch signal. The electronic wallet manager 103B of the processor 103 may convert the currency into a third graphic presentation (e.g., third GUI) in a different unit and display the same. Here, the third graphic presentation of converting the currency may include a dynamic image of converting the bill or the coin corresponding to the currency into a different unit (e.g., a different currency unit). For example, the dynamic image included in the third graphic presentation of converting the currency may be a dynamic image of dividing any one bill or any one coin corresponding to the currency into a plurality of subunits (e.g., dividing the bill with a face value of 1,000 NTD into 10 bills with a face value of 100 NTD), and/or a dynamic image of merging a plurality of bills or a plurality of coins corresponding to the currency into a single unit (e.g., merging 10 coins with a face value of 1 NTD into a coin with a face value of 10 NTD).

In some embodiments, when the electronic wallet manager 103B of the processor 103 displays the second graphic presentation of transmitting the currency, sound (e.g., a voice) may be output through a speaker of the electronic device 10, or vibration may be generated through a vibrator of the electronic device 10, and/or a visual effect may be generated through (e.g., output on) the touch screen. In some embodiments, when the electronic wallet manager 103B of the processor 103 displays the second graphic presentation of transmitting the currency, at least one of the sound, vibration, and/or visual effects described above may be simultaneously or contemporaneously output.

Next, the electronic wallet manager 103B of the processor 103 may execute operation S430 to determine (e.g., calculate) an amount of the electronic transaction based on the value (e.g., face value) of the currency (or bill) according to the operation signal for currency transmission (e.g., the currency transmission signal). In some embodiments, when the currency transmission function is for the user to pay a cost, the first graphic presentation of the currency shows the balance of the electronic wallet. Accordingly, when the operation of operating the currency is the operation of taking the currency out of the electronic wallet, according to the operation signal for currency transmission, the electronic wallet manager 103B of the processor 103 may calculate the estimated balance of the electronic wallet and display an estimated amount of electronic transaction. For example, when the operation of operating the currency is the operation of taking the currency out of the electronic wallet, the electronic wallet manager 103B of the processor 103 may subtract the amount corresponding to the currency from the estimated balance of the electronic wallet and add it to the estimated amount of the electronic transaction displayed before the operation of operating the currency is performed. On the other hand, when the operation of operating the currency corresponds to an operation of putting the currency into the electronic wallet, the electronic wallet manager 103B of the processor 103 may display the amount of electronic transaction according to the operation signal for currency transmission. For example, the amount corresponding to the currency from the payment amount may be added to the estimated balance of the electronic wallet and subtracted from the estimated amount of electronic transaction displayed before the operation of operating the currency is performed.

For example, when the user moves the first graphic presentation of the currency located in the electronic wallet area (e.g., an image of a 1,000 NTD bill in the electronic wallet area) from the electronic wallet area, this indicates that the user proceeds with the payment operation using the currency in the electronic wallet. Thus, a value corresponding to the currency may be added to the estimated payment amount (e.g., 1,000 NTD is added to the estimated payment amount). This may indicate that the user intends to pay an amount in the value corresponding to the moved currency.

In addition, when the user moves the first graphic presentation of the currency located outside the electronic wallet area (e.g., an image of 500 NTD bill outside the electronic wallet area) to the electronic wallet area, it may indicate that the user brings the currency outside the electronic wallet into the electronic wallet, and thus, a value corresponding to the currency may be subtracted from the estimated payment amount (e.g., 500 NTD is subtracted from the estimated payment amount). This indicates that, from the amount that the user intended to pay, a certain amount is returned into the electronic wallet.

In some embodiments, when the currency transmission function is for the user to receive information from the information processing system 20 using the electronic device 10, in which the information is about the payment made by another user using another electronic device, the first graphic presentation of the currency represents an amount of income according to the payment information. Therefore, when the operation of operating the currency corresponds to the operation of putting the currency into the electronic wallet, the electronic wallet manager 103B of the processor 103 may subtract an amount corresponding to the currency from the estimated balance of the amount (transaction amount) received from another user according to the operation signal for currency transmission, and adds the amount corresponding to the currency to the estimated balance of the electronic wallet. On the other hand, when the operation of operating the currency corresponds to the operation of sending the currency out of the electronic wallet, the electronic wallet manager 103B of the processor 103 may add a value corresponding to the currency to the estimated payment amount, and subtracts the amount corresponding to the currency from the estimated balance of the electronic wallet according to the operation signal for currency transmission.

For example, when the user moves the first graphic presentation of the currency located outside the electronic wallet area (e.g., a video of a 1,000 NTD bill in an area outside the electronic wallet) into the electronic wallet area, an operation of receiving an amount paid (or transferred) by another user may be performed. Accordingly, by subtracting the amount corresponding to the currency from the collected amount (or received amount) (e.g., by subtracting 1,000 NTD from the received amount) and adding the corresponding amount to the estimated amount of the electronic wallet, it may be indicated that the user received the amount corresponding to the currency.

Subsequently, after the receiving is processed and before the transaction is completed, when the user moves the first graphic presentation of the currency located in the electronic wallet area (e.g., a video of a 500 NTD bill in the electronic wallet area) from the electronic wallet area to the transaction area, it may be indicated that the user returns the currency to the electronic wallet. Accordingly, the amount corresponding to the currency may be added to the received amount (e.g., 500 NTD is added to the received amount), indicating that the user returns a portion of the received amount into the electronic wallet.

In some embodiments, after all the operation signals for currency transmission are processed to determine the amount of electronic transaction, at operation S440, the transaction processor 103A of the processor 103 may transmit information related to the amount of the electronic transaction (e.g., a signal containing the information related to the amount of the electronic transaction) to the information processing system 20 using the communication module 105 to proceed with the electronic transaction. According to some embodiments, the transaction processor 103A of the processor 103 may generate the signal containing the information related to the amount of the electronic transaction based on the amount determined in operation S430. In some embodiments, when the currency transmission function is for the user to proceed with the payment, the transaction processor 103A of the processor 103 may transmit information for paying the amount of the electronic transaction to the information processing system 20 using the communication module 105 to complete the electronic transaction of payment. In some embodiments, when the currency transmission function is for the user to collect money from another user, the transaction processor 103A of the processor 103 may transmit information on the amount of the electronic transaction for collection money to the information processing system 20 using the communication module 105 to complete the electronic transaction of collection.

Figure 5:
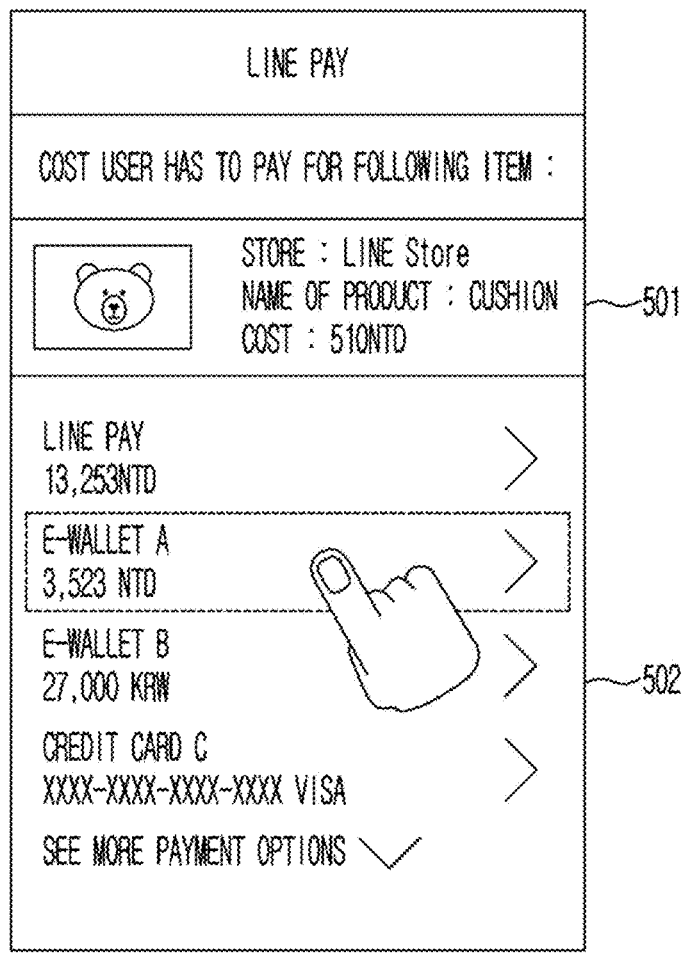
FIGS. 5 and 6 are explanatory diagrams illustrating an interface for operating a transmission of currency according to some embodiments.

In some embodiments, the electronic transaction software installed in the electronic device 10 includes a GUI for operating the electronic transaction. FIG. 5 is an explanatory diagram illustrating a GUI 500 of electronic transaction software according to some embodiments. As illustrated, after the user performs online shopping in the network store "LINE Store" using the electronic transaction software installed in the electronic device 10, the electronic device 10 displays the GUI 500 for notifying about a payment on the touch screen. Here, the GUI 500 includes a payment information area 501 and/or an electronic wallet area 502.

In some embodiments, the electronic wallet area 502 may display at least one electronic wallet which was previously registered by the user after successfully (e.g., legally) logging in. Specifically, in this example, the electronic wallet that may be used by the user includes LINE Pay, electronic wallet A, electronic wallet B, and/or credit card C. Among them, the balance unit of the LINE Pay and the electronic wallet A may be NT dollars (Taiwanese dollar NTD), and the balance unit of electronic wallet B may be Korean won KRW. The credit card C may be a credit card issued by VISA, and a customer of the corresponding credit card may be displayed in the electronic wallet area 502.

Figure 6:
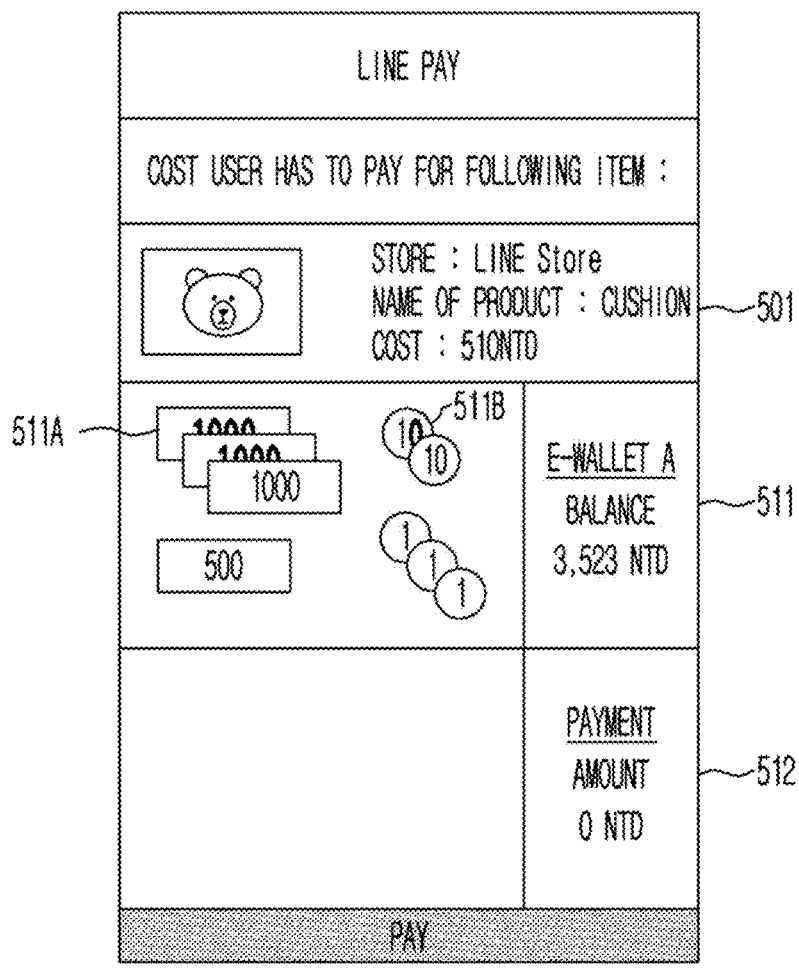

Next, since the amount of an item to be paid is displayed in NT dollars in the payment information area 501, the user may go to the GUI 510 illustrated in FIG. 6 by touching the electronic wallet A in the electronic wallet area 502 by way of clicking. Specifically, after the electronic wallet A is clicked, the electronic device 10 displays the GUI 510 on the touch screen. In some embodiments, the GUI 510 includes an electronic wallet A operation area 511 and/or a payment operation area 512, in which the electronic wallet A operation area 511 displays the estimated balance of the electronic wallet A, and the payment operation area 512 displays the estimated payment amount. In this example, the electronic wallet manager 103B is in a state of displaying the first graphic presentation of 3,523 NTD currency in the electronic wallet A operation area 511. In some embodiments, the first graphic presentation of the currency may include images 511A of bills and/or images 511B of coins with various face values corresponding to the currency of the estimated balance of the electronic wallet A.

Figure 7:
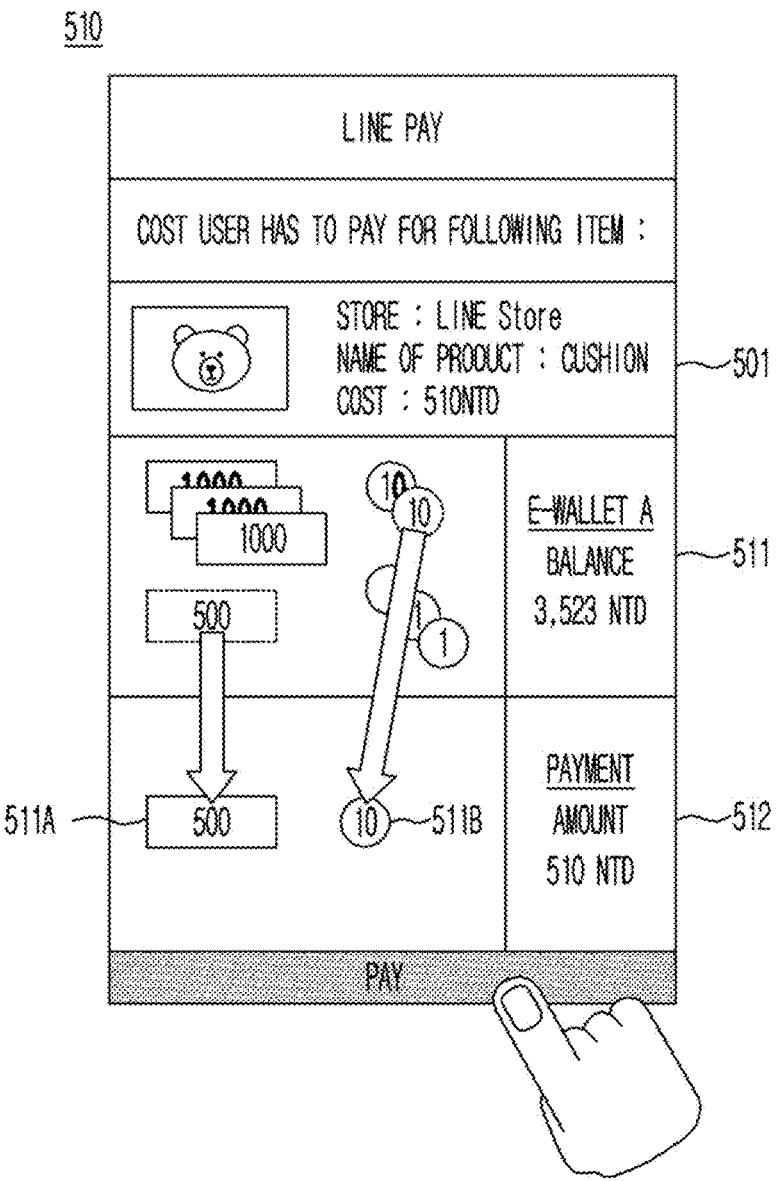
FIG. 7 is an explanatory diagram illustrating a graphic presentation of automatically transmitting the currency according to some embodiments.

In some embodiments, the user may directly touch a "pay" button at the bottom of the GUI 510 to perform the transmission operation. Referring to FIG. 7, when the touch screen detects that the pay button of the GUI 510 is clicked, that is, when the touch screen detects a touch signal at the pay button portion of the GUI 510, the electronic wallet manager 103B may display on the touch screen a second graphic presentation of automatically transmitting the currency. More specifically, the second graphic presentation of transmitting the currency may include a dynamic image of moving the currency in the electronic wallet A operation area 511 to the payment operation area 512. In other words, the second graphic presentation of transmitting the currency includes a dynamic image of moving the bills 511A and/or the coins 511B in the electronic wallet A operation area 511 to the payment operation area 512.

In some embodiments, the electronic wallet manager 103B may automatically transmit the amount to be paid to the payment operation area 512 according to the operation signal for currency transmission detected by the touch screen, that is, according to the click touch signal of the pay button, and lastly, after completing the automatic transmission, pop up a confirmation message to ask the user whether to confirm to pay. After the user clicks the confirmation message, the transaction processor 103A may transmit information on the amount of electronic transaction to the information processing system 20 through the communication module 105 to proceed with the electronic transaction. In other words, the payment operation is completed in the information processing system 20.

More specifically, the electronic wallet manager 103B may automatically display a second graphic presentation of transmitting the currency according to a click touch signal on the pay button detected by the touch screen. That is, the electronic wallet manager 103B may automatically display a dynamic image of moving the currency from the electronic wallet A operation area 511 to the payment operation area 512, and display the estimated payment amount corresponding to the currency moved to the payment operation area 512, and then display a pop up a confirmation message to ask the user whether to pay. After the user clicks the confirmation message, the transaction processor 103A may transmit information on the estimated payment amount to the information processing system 20 through the communication module 105 to proceed with the electronic transaction. In other words, the payment operation is completed in the information processing system 20.

For example, when the cost to be paid is 510 NTD, upon a direct click by the user on the pay button of the GUI 510, the electronic wallet manager 103B may automatically move the currency corresponding to 510 NTD from the electronic wallet A operation area 511 into the payment operation area 512, while also displaying a dynamic image of moving the currency (e.g., moving bills and/or coins corresponding to the currency), and the payment operation is completed by the transaction processor 103A.

Figure 8:
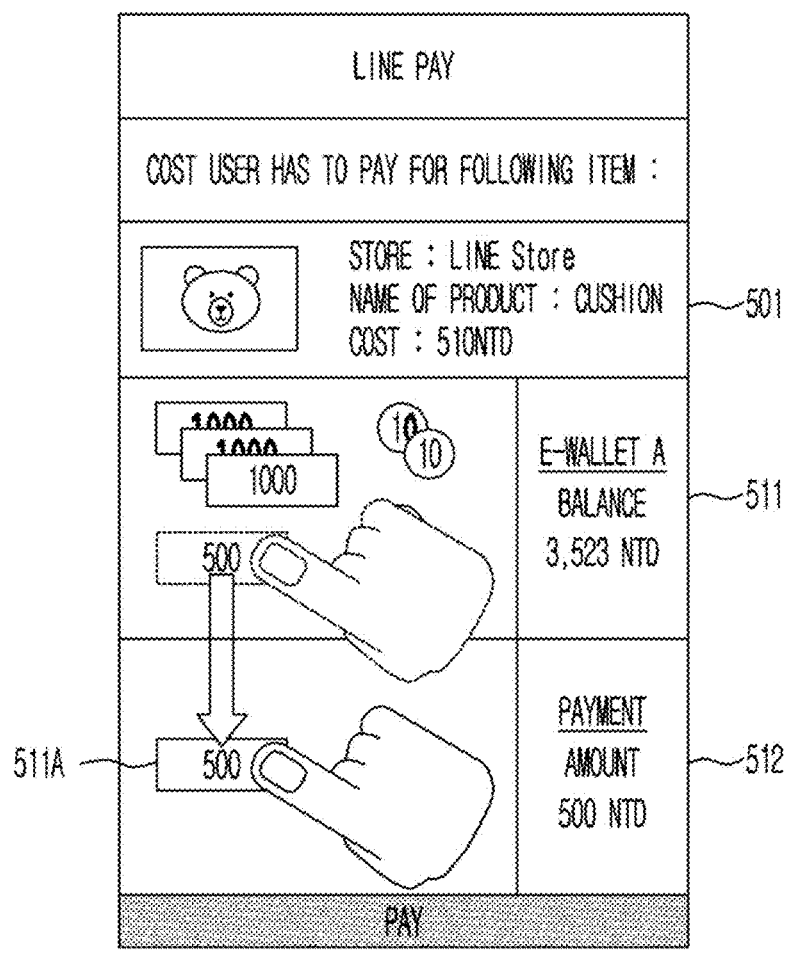
FIGS. 8 and 9 are explanatory diagrams illustrating a graphic presentation of manually transmitting the currency according to some embodiments.

In some embodiments, the user may move the first graphic presentation of the currency, that is, move the bill images 511A and/or the coin images 511B to perform the currency transmission operation. Referring to FIG. 8, when the touch screen detects that the first graphic presentation of the currency is dragged (that is, when the touch screen detects a drag signal in the image 511A portion of the bill), the electronic wallet manager 103B displays on the touch screen a second graphic presentation of transmitting the currency. More specifically, the second graphic presentation of transmitting the currency includes a dynamic image of moving the currency in the electronic wallet A operation area 511 to the payment operation area 512. In other words, the second graphic presentation of transmitting the currency includes a dynamic image of moving the bill 511A in the electronic wallet A operation area 511 to the payment operation area 512 according to the drag operation of the user.

Figure 9:
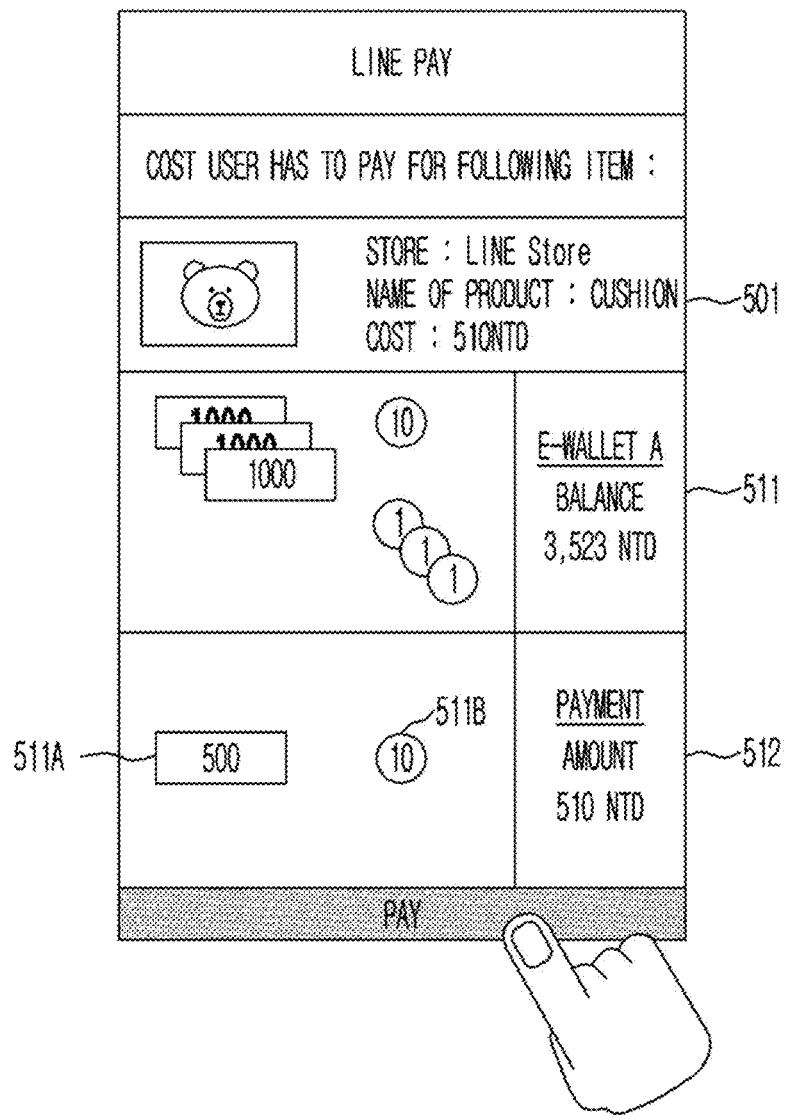

In addition, referring to FIG. 9, after the user drags enough currency (that is, after dragging the cost to be paid to the payment operation area 512), the electronic wallet manager 103B may determine an estimated payment amount according to the operation signal for currency transmission detected by the touch screen, that is, according to the drag touch signal of the first graphic presentation of the currency, and display the determined estimated payment amount in the payment operation area 512. When the user clicks the pay button again, a final confirmation message may be displayed as a pop up to ask the user whether to proceed with payment. After the user clicks the confirmation message, the transaction processor 103A may transmit information on the estimated payment amount to the information processing system 20 through the communication module 105 to proceed with the electronic transaction. In other words, the payment operation may be completed in the information processing system 20.

For example, when the cost to be paid is 510 NTD, the user may directly drag the currency corresponding to 510 NTD from the electronic wallet A operation area 511 into the payment operation area 512. Accordingly, the electronic wallet manager 103B may display a dynamic image of moving the currency, and complete the payment operation through the transaction processor 103A.

In some embodiments, when the user drags the first graphic presentation of the currency from the electronic wallet A operation area 511 to the payment operation area 512, the electronic wallet manager 103B may add an amount corresponding to the first graphic presentation of the currency to the estimated payment amount according to the drag touch signal. For example, when the user drags the bill 511A with a face value of 500 NTD from the electronic wallet A operation area 511 to the payment operation area 512, the electronic wallet manager 103B adds 500 to the estimated payment amount (or payment amount) according to this operation.

In some embodiments, when the user drags the first graphic presentation of the currency from the payment operation area 512 to the electronic wallet A operation area 511, the electronic wallet manager 103B may subtract a value corresponding to the first graphic presentation of the currency from the payment amount according to the drag touch signal. For example, when the user drags the coin 511B with a face value of 10 NTD from the payment operation area 512 to the electronic wallet A operation area 511, the electronic wallet manager 103B subtracts 10 from the payment amount according to this operation.

Figure 10:
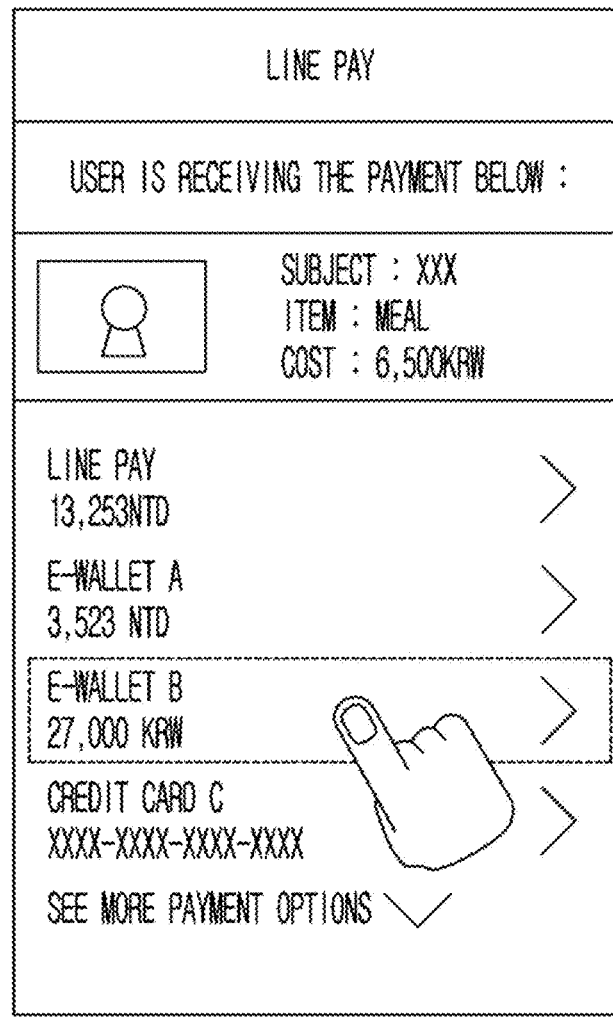
FIGS. 10 and 11 are explanatory diagrams illustrating an interface for operating a transmission of a currency according to some embodiments.

In some embodiments, the electronic transaction software installed in the electronic device 10 includes another GUI for operating the electronic transaction. FIG. 10 is an explanatory diagram illustrating a GUI 600 of electronic transaction software according to some embodiments. In detail, when another user wants to pay an amount to the user, the other user may transmit payment information to the information processing system 20 through another electronic device to proceed with the electronic transaction of transmitting a payment currency to the user. According to this, after receiving the information on the payment made by the another user with respect to the user through another electronic device, the information processing system 20 may further transmit the information including the received amount to the electronic device 10 owned by the user. Herein, the "received amount" represents an amount that another user intends to pay to the user.

Subsequently, after the communication module 105 of the electronic device 10 receives the information including the received amount from the information processing system 20, through the installed electronic transaction software, the electronic device 10 may display on the touch screen the GUI 600 notifying that the cost is received. Here, the GUI 600 may include a collected amount information area 601 and/or an electronic wallet area 602.

In some embodiments, the electronic wallet area 602 may display at least one electronic wallet which was previously registered by the user after successfully (e.g., legally) logging in. Specifically, as illustrated, in this example, the electronic wallet that may be used by the user includes LINE Pay, electronic wallet A, electronic wallet B, and/or credit card C.

Figure 11:
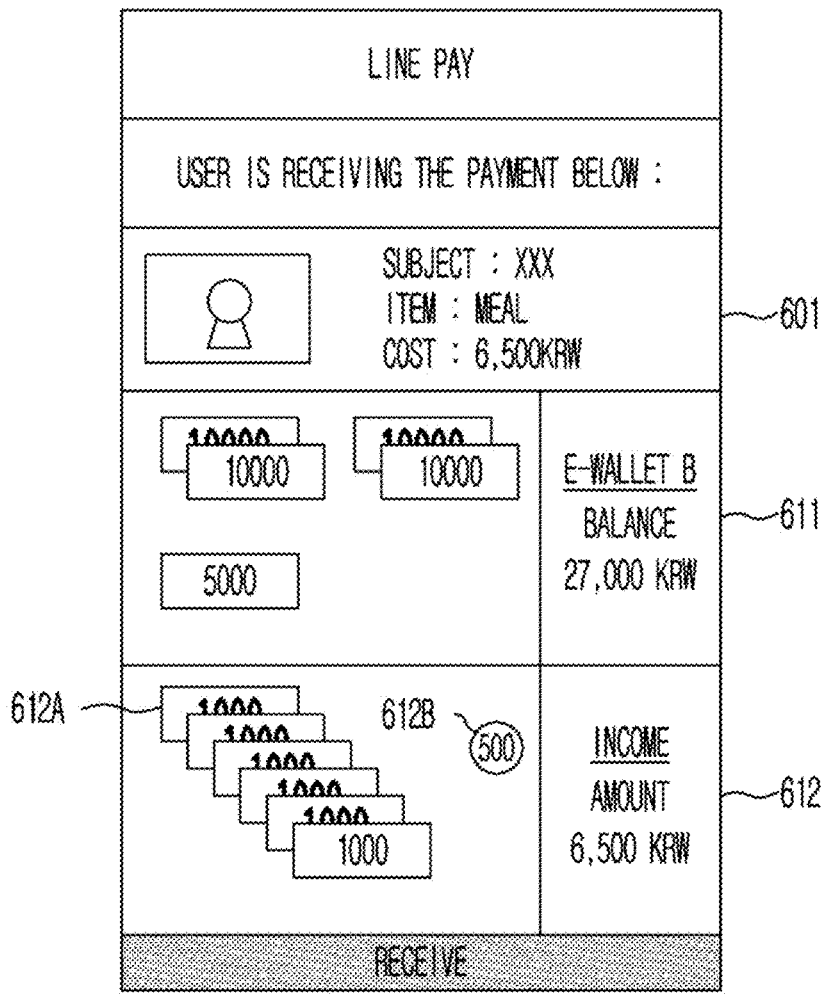

The amount of the item to be received in the collected amount information area 601 may be displayed in KRW, and accordingly, the user may go to the GUI 610 illustrated in FIG. 11 by touching the electronic wallet B in the electronic wallet area 602 by way of clicking. In detail, when the user clicks the electronic wallet B, the electronic device 10 may display the GUI 610 on the touch screen. In some embodiments, the GUI 610 includes an electronic wallet B operation area 611 and an income operation area 612, in which the electronic wallet B operation area 611 may display the balance of the electronic wallet B and the income operation area 612 may display an expected amount to be received. Here, the electronic wallet manager 103B is in the state of displaying the first graphic presentation of the currency 6,500 KRW in the income operation area 612. In some embodiments, the first graphic presentation of the currency may include images 612A of bills and/or images 612*b* of coins with various face values corresponding to the currency.

Figure 12:
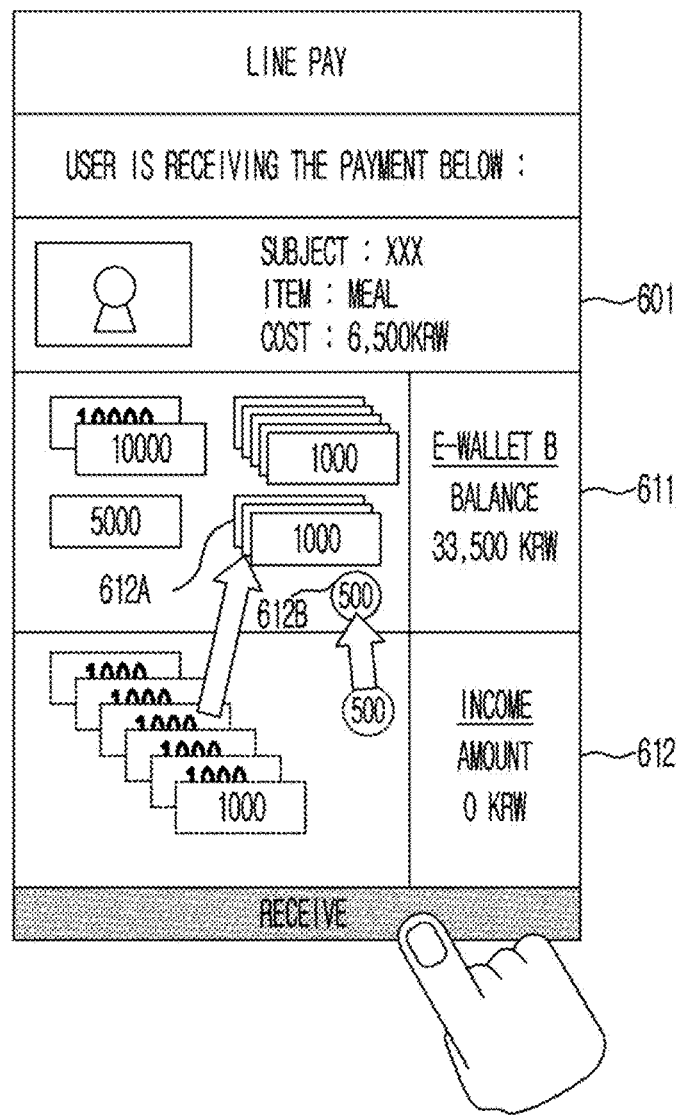
FIG. 12 is an explanatory diagram illustrating a graphic presentation of automatically transmitting the currency according to some embodiments.

In some embodiments, the user may directly touch a "receive" button at the bottom of the GUI 610 to perform the transmission operation. Referring to FIG. 12, when the touch screen detects that the receive button of the GUI 610 is clicked (that is, when the touch screen detects a touch signal at the receive button portion of the GUI 610), the electronic wallet manager 103B may display on the touch screen a second graphic presentation of automatically transmitting the currency. More specifically, the second graphic presentation of transmitting the currency may include a dynamic image of moving the currency in the income operation area 612 to the electronic wallet B operation area 611. In other words, the second graphic presentation of transmitting the currency may include a dynamic image of moving the bills 612A and/or coins 612B in the income operation area 612 to the electronic wallet B operation area 611.

In some embodiments, the electronic wallet manager 103B may reflect all the amount of incomes in the electronic wallet B operation area 611 according to the operation signal for currency transmission detected by the touch screen, that is, according to the click touch signal of the receive button, and lastly, after completing reflecting the amount of incomes, display a pop up a confirmation message to ask the user whether to proceed to receive. When the user responds affirmatively to the confirmation message, the transaction processor 103A may transmit information on the amount of income to the information processing system 20 through the communication module 105 to proceed with the electronic transaction. In other words, the receiving operation may be completed in the information processing system 20.

More specifically, the electronic wallet manager 103B may automatically display a second graphic presentation of transmitting the currency, according to the click touch signal of the receive button detected by the touch screen. That is, the electronic wallet manager 103B may automatically display a dynamic image of moving the currency from the income operation area 612 to the electronic wallet B operation area 611, and lastly, after all currencies in the income operation area 612 are moved to the electronic wallet B operation area 611, display a pop up confirmation message to ask the user whether to proceed to receive. When the user responds affirmatively to the confirmation message, the transaction processor 103A may transmit information on the amount of income to the information processing system 20 through the communication module 105 to proceed with the electronic transaction. In other words, the receiving operation may be completed in the information processing system 20.

For example, when the cost to be received is 6,500 KRW, upon a direct click by the user on the receive button of the GUI 610, the electronic wallet manager 103B moves all currencies in the income operation area 612 into the electronic wallet B operation area 611, while also displaying a dynamic image of moving the currency, and the payment operation is completed by the transaction processor 103A.

Figure 13:
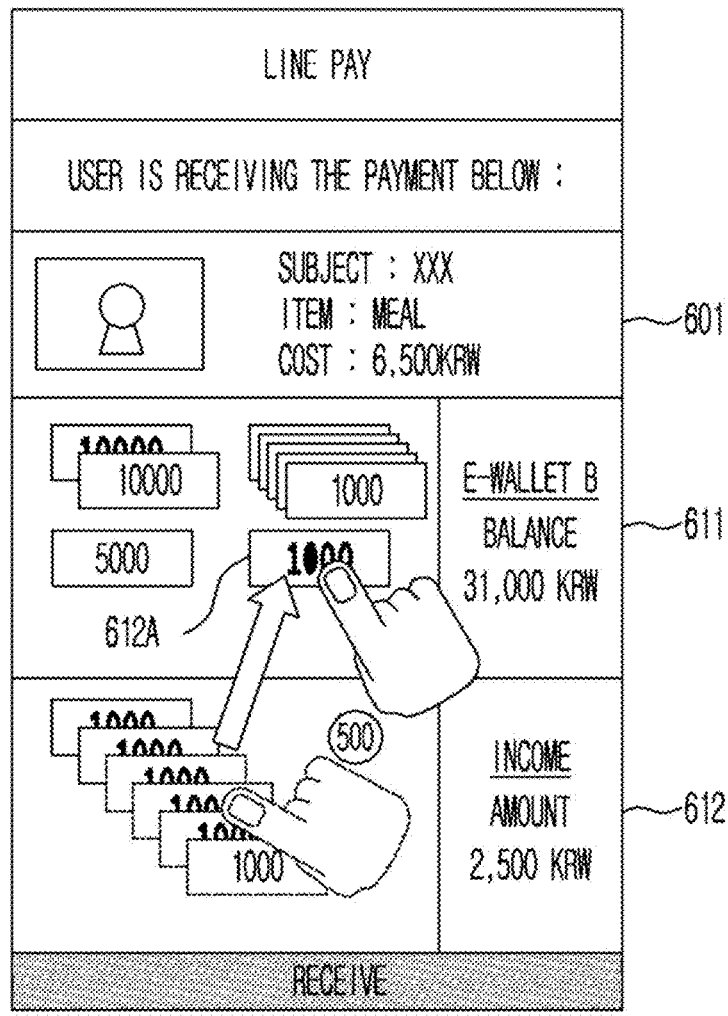
FIGS. 13 and 14 are explanatory diagrams illustrating a graphic presentation of manually transmitting the currency according to some embodiments.

In some embodiments, the user may move the first graphic presentation of the currency. That is, the user may perform the transmission operation by moving the bill images 612A and/or the coin images 612B. Referring to FIG. 13, when the touch screen detects that the first graphic presentation of the currency is dragged (that is, when the touch screen detects a drag signal in the image 612A portion of bill), the electronic wallet manager 103B may display on the touch screen a second graphic presentation for dragging and transmitting the currency. More specifically, the second graphic presentation of transmitting the currency includes a dynamic image of moving the currency in the income operation area 612 to the electronic wallet B operation area 611. In other words, the second graphic presentation of transmitting the currency includes a dynamic image of moving the bill 612A in the income operation area 612 to the electronic wallet B operation area 611 according to the drag operation.

Figure 14:
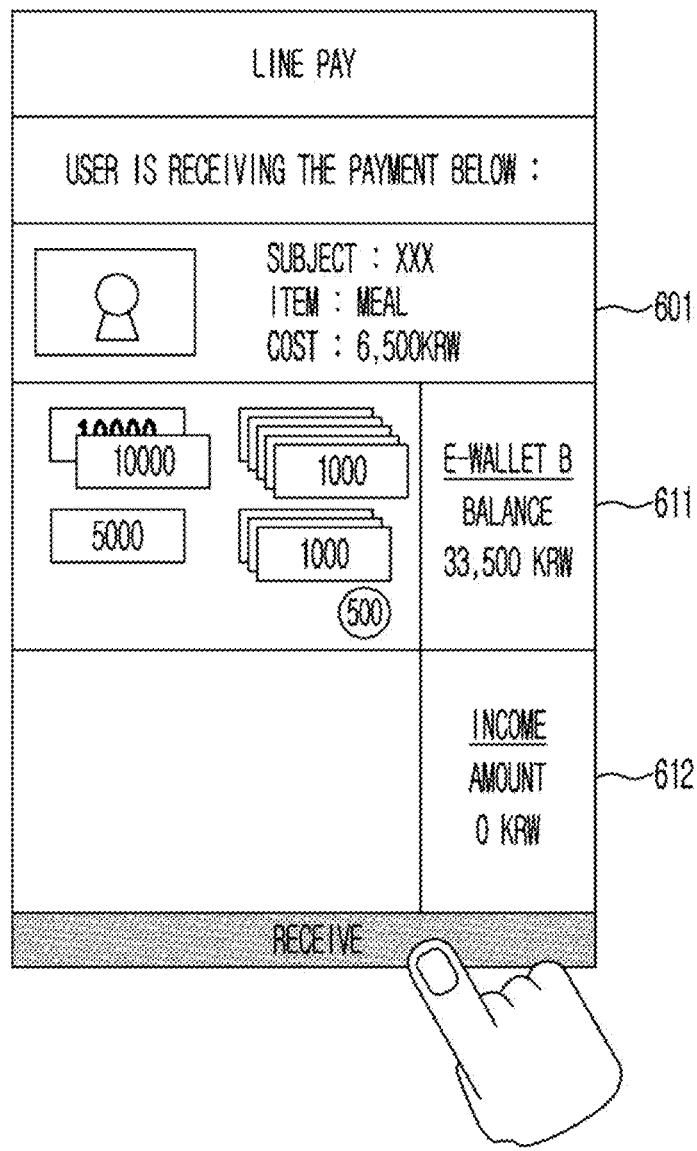

In addition, referring to FIG. 14, after the user drags all the currencies from the income operation area 612 to the electronic wallet B operation area 611, the electronic wallet manager 103B may determine an amount to be received according to the operation signal for currency transmission detected by the touch screen, that is, according to the drag touch signal of the first graphic presentation of the currency, and adds the corresponding amount to the balance of the electronic wallet B operation area 611. When the user further clicks the receive button, lastly, a confirmation message may be displayed as a pop up to ask the user whether to confirm to receive. When the user responds affirmatively to the confirmation message, the transaction processor 103A may transmit information on the estimated amount of income to the information processing system 20 through the communication module 105 to proceed with the electronic transaction, and reflecting the amount of income to the B operation area 611 is completed. In other words, the reception operation is completed in the information processing system 20.

For example, when the cost to be received is 6,500 KRW, the user may directly drag the currency corresponding to 6,500 KRW from the income operation area 612 into the electronic wallet B operation area 611, and the electronic wallet manager 103B may display a dynamic image of moving the currency accordingly, and complete the payment operation through the transaction processor 103A.

In some embodiments, when the user drags the first graphic presentation of the currency from the income operation area 612 into the electronic wallet B operation area 611, the electronic wallet manager 103B may subtract a value corresponding to the first graphic presentation of the currency from the estimated income amount according to the drag touch signal. For example, when the user drags the coin 612B with a face value of 500 KRW from the income operation area 612 into the electronic wallet B operation area 611, the electronic wallet manager 103B subtracts 500 from the estimated income amount according to this operation.

In some embodiments, when the user drags the first graphic presentation of the currency from the electronic wallet B operation area 611 into the income operation area 612, the electronic wallet manager 103B may add the value corresponding to the first graphic presentation of the currency to the estimated income amount according to the drag touch signal. For example, when the user drags the bill 612A with a face value of 1000 KRW from the electronic wallet B operation area 611 into the income operation area 612, the electronic wallet manager 103B adds 1000 KRW to the estimated income amount according to this operation.

Figure 15:
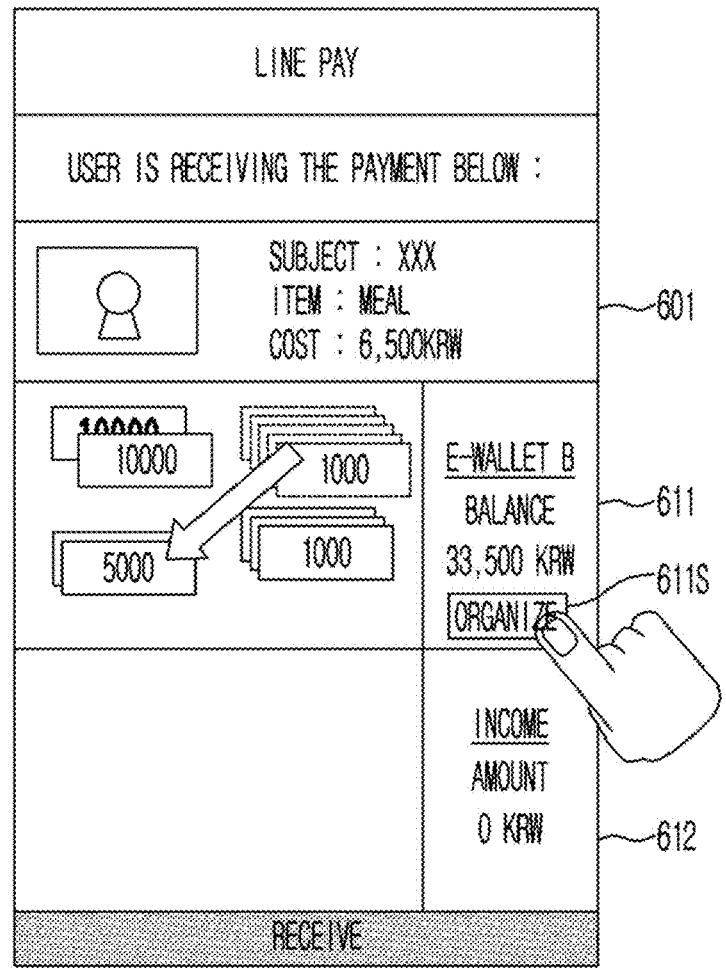
FIGS. 15 and 16 are explanatory diagrams illustrating a graphic presentation according to some embodiments.

Referring to FIG. 15, in some embodiments, the electronic wallet B operation area 611 of the GUI 610 may separately include an organize button 611S, and when the user clicks the organize button 611S, the touch screen may detect a corresponding click touch signal, and the electronic wallet manager 103B may convert the currency into a third graphic presentation of currency in a different unit (e.g., a different currency unit) and display the same. Here, the third graphic presentation of converting the currency may include a dynamic image of converting the bill and/or the coin corresponding to the currency into a different unit. As illustrated, the dynamic image included in the third graphic presentation of converting the currency may be a dynamic image of merging a plurality of bills and/or coins corresponding to the currency into a single unit (for example, merging five bills with a face value of 1000 KRW into one bill with a face value of 5000 KRW).

Figure 16:
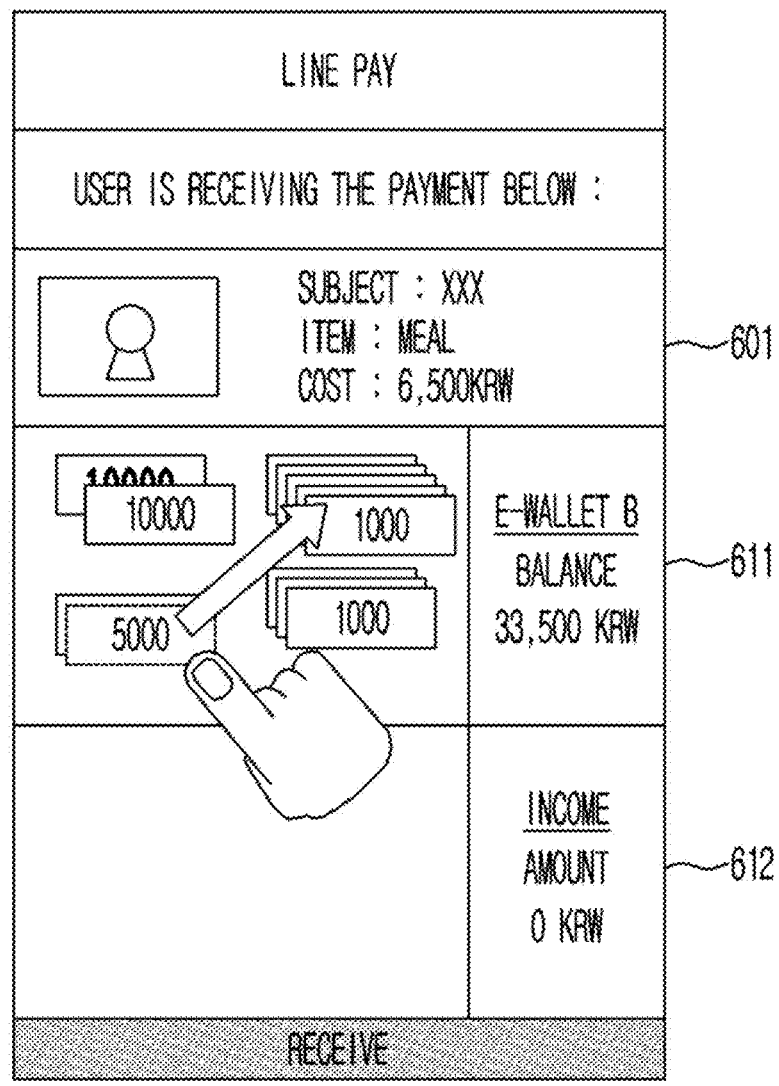

Referring to FIG. 16, in some embodiments, when the user double-clicks the first graphic presentation of the currency, the touch screen detects the corresponding double-click touch signal, and the electronic wallet manager 103B displays the third graphic presentation of converting the currency into a different unit. Here, the third graphic presentation of converting the currency may include a dynamic image of converting a bill or a coin corresponding to the currency into a different unit. As illustrated, the dynamic image included in the third graphic presentation of converting the currency may be a dynamic image of dividing a single bill or a plurality of coins corresponding to the currency into a plurality of sub-units (e.g., dividing one bill with a face value of 5000 KRW into five bills with a face value of 1000 KRW).

In some embodiments, when displaying the second graphic presentation of transmitting the currency, the electronic wallet manager 103B may be configured such that the electronic device 10 outputs at least one of sound through a speaker, vibration through a vibrator, and/or visual effects through a touch screen. For example, as illustrated in FIG. 8, when displaying the dynamic image of dragging the bill 511A, the electronic wallet manager 103B may output a sound of the moved bills through the speaker of the electronic device 10, output a vibration effect through the vibrator of the electronic device 10, or output a visual effect through the touch screen of the electronic device 10.

Figure 17:
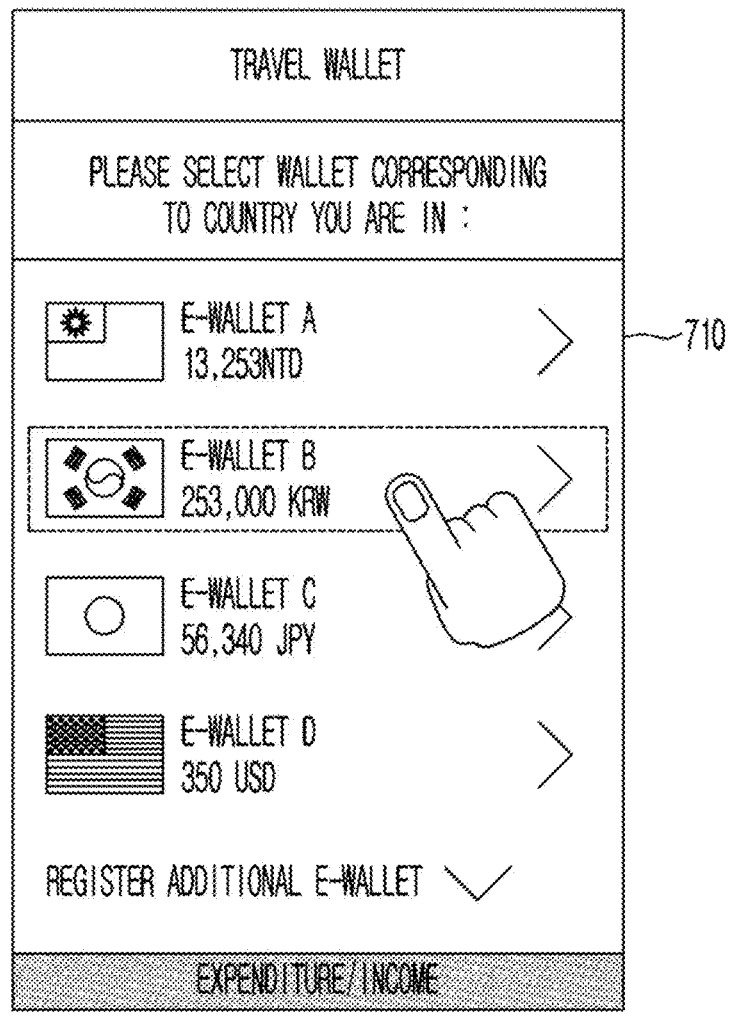
FIG. 17 is an explanatory diagram illustrating an interface of a travel wallet according to some embodiments.

In some embodiments, the electronic transaction software installed in the electronic device 10 includes a GUI for operating an electronic wallet for overseas travelers (hereinafter referred to as "travel wallet"). FIG. 17 is an explanatory diagram illustrating an interface of the travel wallet according to some embodiments. As illustrated, when the user traveling abroad selects and executes a "travel wallet" function capable of recording expenditure and income of the currencies of various countries around the world by using the electronic transaction software installed in the electronic device 10, the electronic device 10 displays on the touch screen a GUI 700 displaying a plurality of electronic wallets included in the travel wallet. Here, the GUI 700 includes an electronic wallet area 710.

In some embodiments, the electronic wallet area 710 may display at least one electronic wallet which was previously registered by the user after successfully (e.g., legally) logging in. Specifically, in this example, the electronic wallets that may be used by the user include electronic wallet A, electronic wallet B, electronic wallet C, and/or electronic wallet D. Among them, the balance unit of the electronic wallet A is Taiwan dollar NTD, the balance unit of the electronic wallet B is Korean won KRW, the balance unit of the electronic wallet C is Japanese yen JPY, and the balance unit of the electronic wallet D is US dollar USD.

For example, through the GUI 700 displayed on the electronic device 10, the user may select the electronic wallet according to the region or country in which he or she is currently traveling. In another example, the user's electronic device 10 may automatically select an electronic wallet on the GUI 700, using the currency unit of the country in which the user is located based on the current location of the user detected using a geographical positioning system (GPS) or a roaming function, Although not illustrated, the user's electronic device 10 may display on the GUI 700 only the electronic wallet that uses the currency unit of the country in which the user is located, based on the current user's location detected using the geolocation information system or the roaming function, or display only the electronic wallet that uses the currency unit of the user's residence and the electronic wallet that uses the currency unit of the country in which the user is located, or prioritize display of an electronic wallet that uses the currency unit of the country in which the user is located over another electronic wallet.

Figure 18:
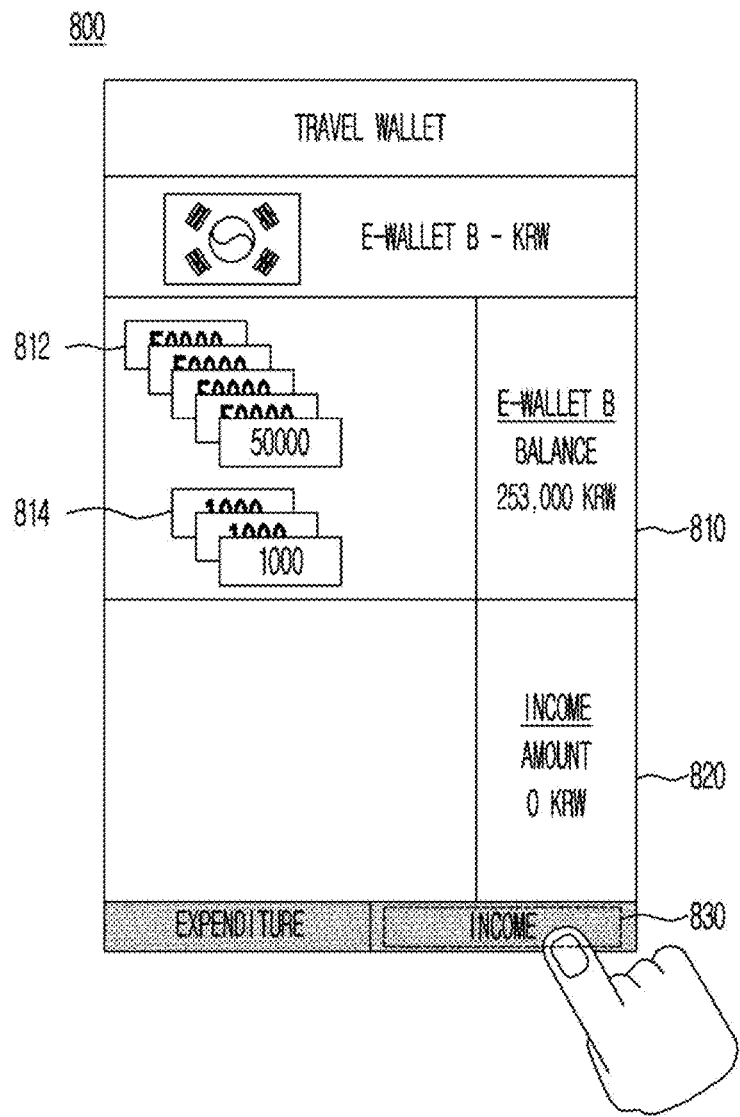
FIGS. 18 to 20 are explanatory diagrams illustrating a graphic presentation of processing the currency income in the travel wallet according to some embodiments.
Figure 19:
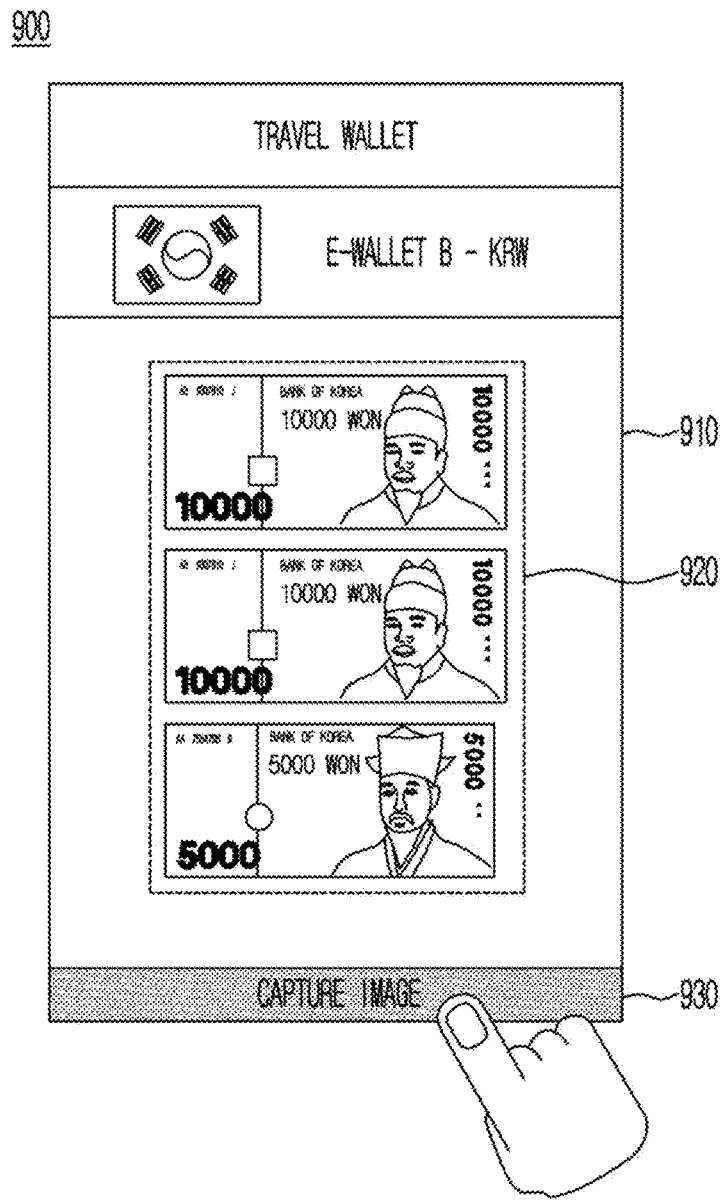
Figure 20:
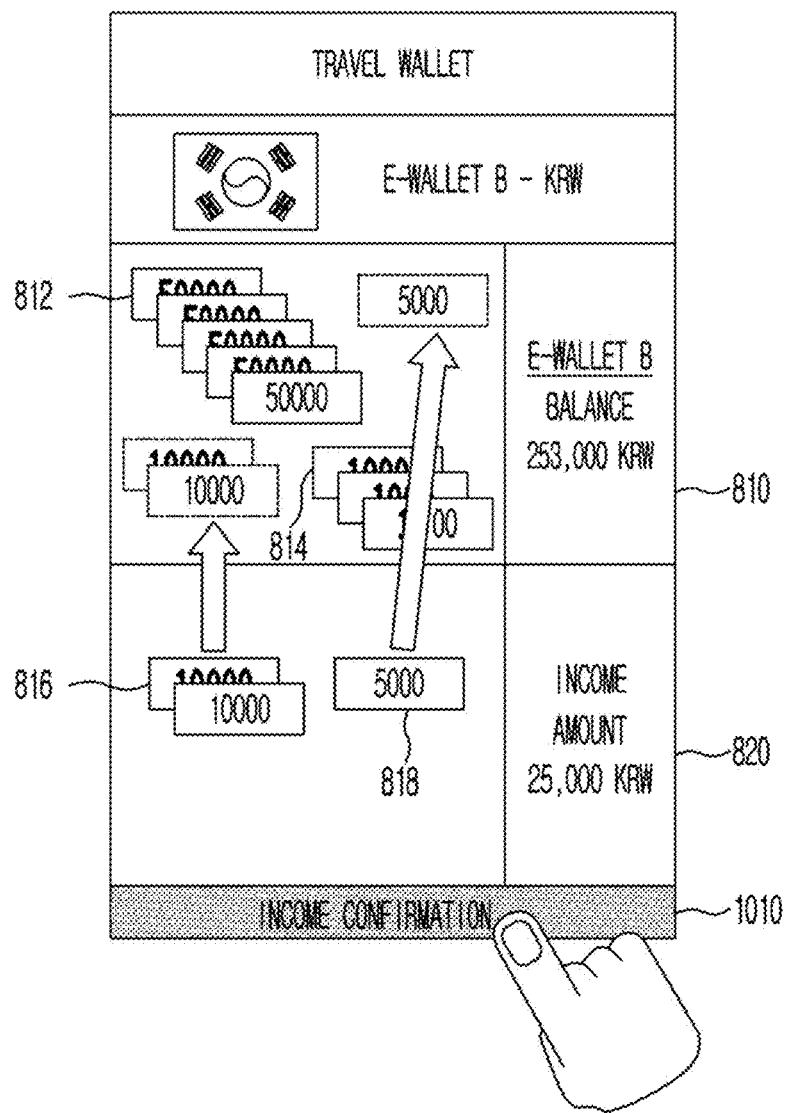

FIGS. 18 to 20 are explanatory diagrams illustrating a graphic presentation of processing the currency income in the travel wallet according to some embodiments.

In the example of FIG. 17, the user is currently traveling in Korea, and accordingly, the user may go to the GUI 800 illustrated in FIG. 18 by touching the electronic wallet B in the electronic wallet area 710 by way of clicking. Specifically, after the electronic wallet B is clicked, the electronic device 10 may display the GUI 800 on the touch screen. In some embodiments, the GUI 800 may include an electronic wallet B operation area 810 and/or a payment operation area 820, in which the electronic wallet B operation area 810 displays the estimated balance of the electronic wallet B, and the payment operation area 820 displays an estimated payment amount (e.g., an estimated income amount or an estimated expenditure amount). In this example, the electronic wallet manager 103B is in a state of displaying the first graphic presentation of 253,000 KRW currency in the electronic wallet B operation area 810. In some embodiments, the first graphic presentation of the currency may include images 812, 814 of bills with various face values corresponding to the currency of the estimated balance of the electronic wallet B.

In some embodiments, the user may go to a GUI 900 illustrated in FIG. 19 by directly touching an "income" button 830 at the bottom of the GUI 800 to perform an income operation with the electronic wallet B. Referring to FIG. 19, the GUI 900 may include a real currency preview area 910. In the real currency preview area 910, images of real bills and/or coins, which are the target to be transmitted by the user as income of the electronic wallet B, may be displayed. That is, when the user touches the income button 830, the GUI 900 may be displayed on the display of the electronic device 10 and the camera installed in the electronic device 10 may be operated. Accordingly, the user may position the camera of the electronic device 10 to face the real bills and/or coins, which are the target to be transmitted as income of the electronic wallet B. In this case, an image 920 of the real bill captured by the camera may be displayed in the real currency preview area 910.

When the user checks the image 920 of the real bill displayed in the real currency preview area 910 of the GUI 900 and then touches a "capture image" button 930 at the bottom of the GUI 900, the electronic wallet manager 103B may control the camera to capture the image 920 of the real bill and analyze the image to identify the face value of each real bill. For example, the electronic wallet manager 103B may analyze the image 920 of the real bills, and identify the face value of each of the real bill by executing an artificial neural network or deep learning algorithm trained to analyze the image of a real currency (that is, bills, coins, and/or the like) and recognize the face value.

Next, as illustrated in FIG. 20, the electronic device 10 may display a GUI 1000 displaying a first graphic presentation of the real currency identified by the electronic wallet manager 103B. In some embodiments, the GUI 1000 may include an electronic wallet B operation area 810 and/or a payment operation area 820, in which the electronic wallet B operation area 810 displays the estimated balance of the electronic wallet B, and the payment operation area 820 displays an estimated payment amount (or estimated income amount). In this example, the electronic wallet manager 103B is in a state of displaying the first graphic presentation of 253,000 KRW currency in the electronic wallet B operation area 810. In some embodiments, the first graphic presentation of the currency may include images 812, 814 of bills with various face values corresponding to the currency of the estimated balance of the electronic wallet B.

In some embodiments, the user may directly touch an "income confirmation" button 1010 at the bottom of the GUI 1000 to proceed with the transmission operation. Referring to FIG. 20, when detecting on the touch screen that the income confirmation button 1010 is clicked, that is, when the touch screen detects a touch signal at the income confirmation button 1010 portion of the GUI 1000, the electronic wallet manager 103B may display on the touch screen a second graphic presentation of automatically transmitting the currency. More specifically, the second graphic presentation of transmitting the currency may include a dynamic image of moving the currency in the payment operation area 820 to the electronic wallet B operation area 810. In other words, the second graphic presentation of transmitting the currency may include a dynamic image of moving the bills 816, 818 in the payment operation area 820 to the electronic wallet B operation area 810.

In some embodiments, the electronic wallet manager 103B may automatically transmit the amount of income to the electronic wallet B operation area 810 according to the operation signal for currency transmission detected by the touch screen, that is, according to the click touch signal of the income confirmation button, and lastly, after the automatic transmission is completed, display a pop up confirmation message to ask the user whether to confirm to receive. After the user clicks the receive confirmation message, the transaction processor 103A may transmit information on the amount of electronic transaction to the information processing system 20 through the communication module 105 to proceed with the electronic transaction. In other words, the additional operation of the amount of income for the electronic wallet B may be completed in the information processing system 20.

More specifically, the electronic wallet manager 103B may automatically display a second graphic presentation of transmitting the currency according to the click touch signal of the income confirmation button detected by the touch screen. That is, the electronic wallet manager 103B may automatically display a dynamic image of moving the currency from the payment operation area 820 to the electronic wallet B operation area 810, display the estimated balance of the electronic wallet B corresponding to the currency moved to the electronic wallet B operation area 810, and then display a pop up confirmation message to ask the user whether to pay. After the user clicks the confirmation message, the transaction processor 103A transmits information on the estimated payment amount to the information processing system 20 through the communication module 105 to proceed with the electronic transaction. In other words, the additional operation of the amount of income for the electronic wallet B may be completed in the information processing system 20.

For example, when the amount of income to be added to the electronic wallet B is 25,000 KRW, upon a direct click by the user on the income confirmation button of the GUI 1000, the electronic wallet manager 103B automatically moves the currency corresponding to 25,000 KRW from the payment operation area 820 into the electronic wallet B operation area 810, while also displaying a dynamic image of moving the currency, and the additional operation of the amount of income is completed by the transaction processor 103A.

Although not illustrated, money exchange may be processed between electronic wallets having different currency units. Specifically, when the GUI 800 is displayed on the touch screen as illustrated in FIG. 18, an electronic wallet having a different currency unit may be displayed in the payment operation area 820. For example, the electronic wallet B (currency unit KRW) and the electronic wallet A (currency unit NTD) may be displayed. In this case, when a portion of the currency of the electronic wallet A is moved from the electronic wallet A to the electronic wallet B, an amount corresponding to the moved portion of the currency may be exchanged according to a predetermined or alternatively, given exchange rate and represented as the currency corresponding to the electronic wallet B. When the portion of the currency of the electronic wallet B is moved from the electronic wallet B to the electronic wallet A, an amount corresponding to the moved portion of the currency may be exchanged according to a certain exchange rate and represented as the currency corresponding to the electronic wallet A. When the user moves 40,000 KRW from the electronic wallet B to the electronic wallet A, by applying the 40 KRW: 1 NTD exchange rate, the currency corresponding to 40,000 KRW in the electronic wallet B may be displayed as being deleted, and 1,000 NTD may be reflected in the electronic wallet A, and by applying the 38 KRW: 1 NTD exchange rate, the currency corresponding to 38,000 KRW in the electronic wallet B may be displayed as being deleted, and the currency corresponding to 2,000 KRW may be additionally displayed in the electronic wallet B and the currency corresponding to 1,000 NTD may be additionally displayed in the electronic wallet A.

FIGS. 21 to 24 are explanatory diagrams illustrating a graphic presentation of processing the currency expenditure in the travel wallet according to some embodiments.

Figure 21:
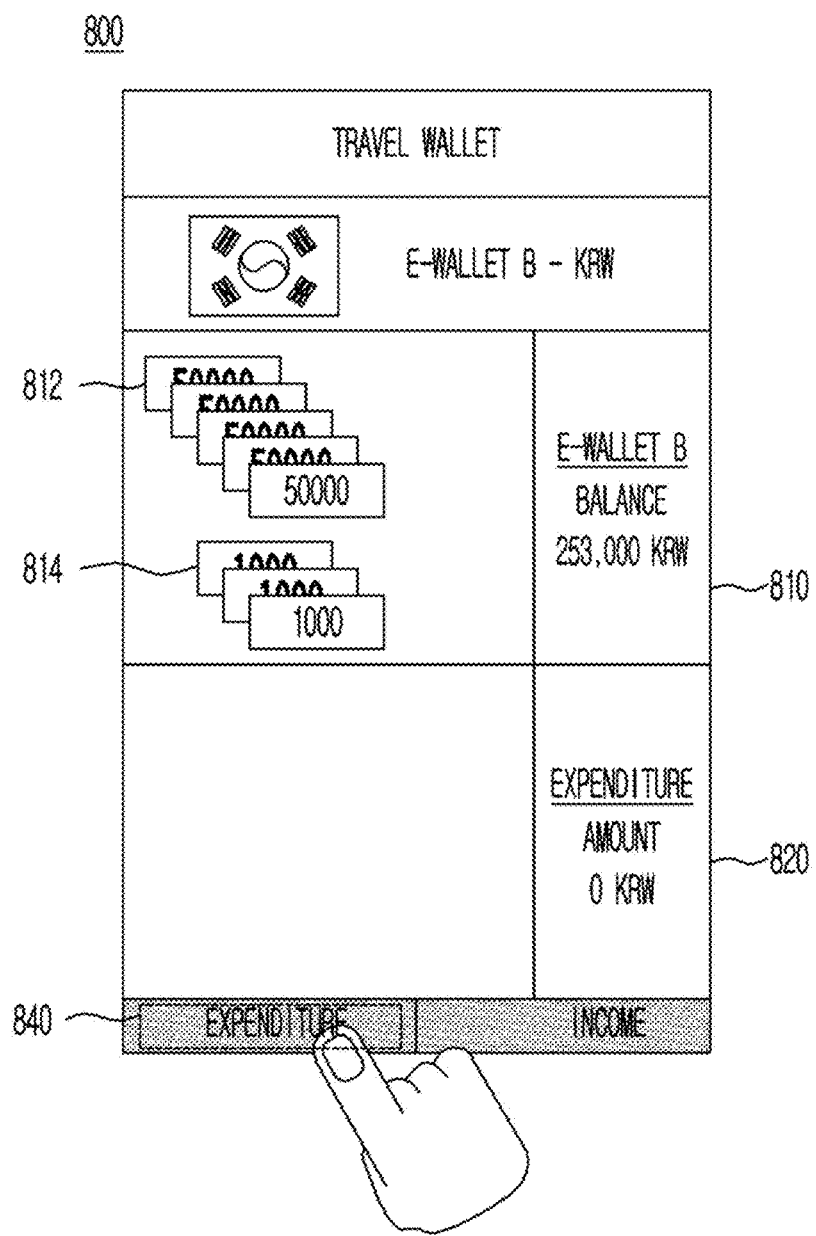
FIGS. 21 to 24 are explanatory diagrams illustrating a graphic presentation of processing the currency expenditure in the travel wallet according to some embodiments.
Figure 22:
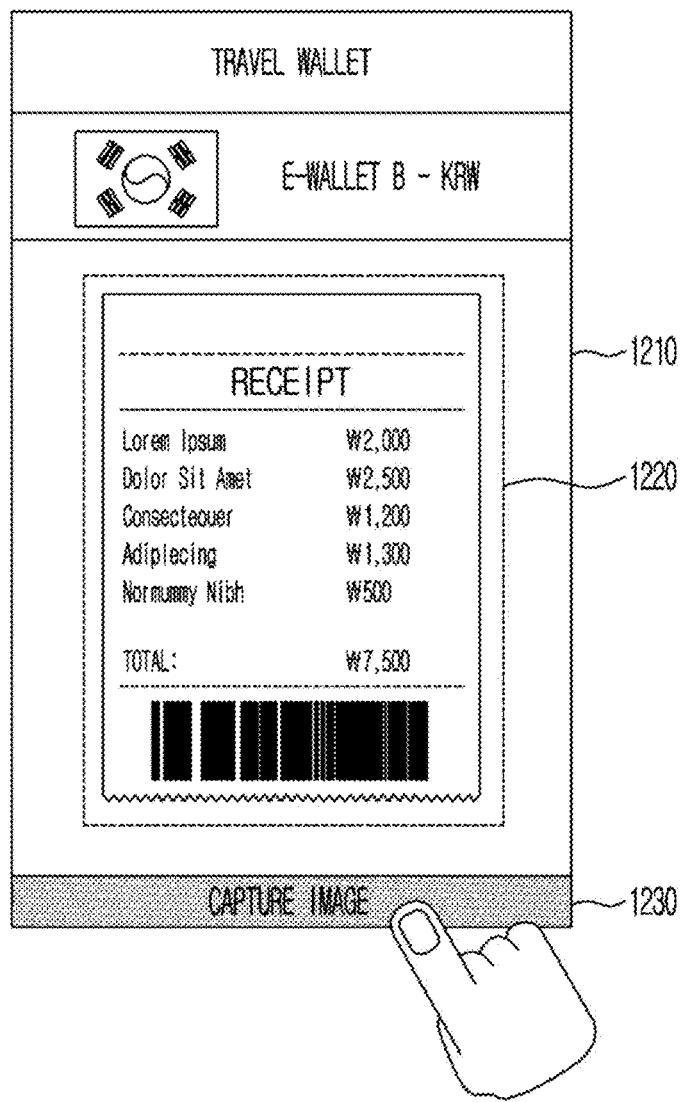

Referring back to the example of FIG. 17, the user is currently traveling in Korea, and accordingly, the user may go to the GUI 800 illustrated in FIG. 21 by touching the electronic wallet B in the electronic wallet area 710 by way of clicking. Specifically, after the electronic wallet B is clicked, the electronic device 10 may display the GUI 800 on the touch screen. In some embodiments, the user may go to a GUI 1200 illustrated in FIG. 22 by directly touching an "expenditure" button 840 at the bottom of the GUI 800 to perform an operation of expenditure from the electronic wallet B. Referring to FIG. 22, the GUI 1200 may include a transaction details preview area 1210. In the transaction details preview area 1210, an image of the transaction details (e.g., receipts, slips, and/or the like) that may indicate or verify the amount spent by the user from the electronic wallet B may be displayed. That is, when the user touches the expenditure button 840, the GUI 1200 may be displayed on the display of the electronic device 10 and the camera installed in the electronic device 10 may be operated. Accordingly, the user may position the camera of the electronic device 10 to face the transaction details representing the expenditure from the electronic wallet B. In this case, an image 1220 of the transaction details captured by the camera may be displayed in the transaction details preview area 1210.

When the user checks the image 1220 of the transaction details displayed in the transaction details preview area 1210 of the GUI 1200 and then touches a "capture image" button 1230 at the bottom of the GUI 1200, the electronic wallet manager 103B may control the camera to capture the image 1220 of the transaction details and analyze the image to identify an expenditure amount according to the transaction details. For example, the electronic wallet manager 103B may analyze the image 1220 of the transaction details and identify the expenditure amount by executing an artificial neural network or deep learning algorithm trained to analyze the image of the transaction details (that is, receipts, slips, and/or the like) and recognize the expenditure amount.

Figure 23:
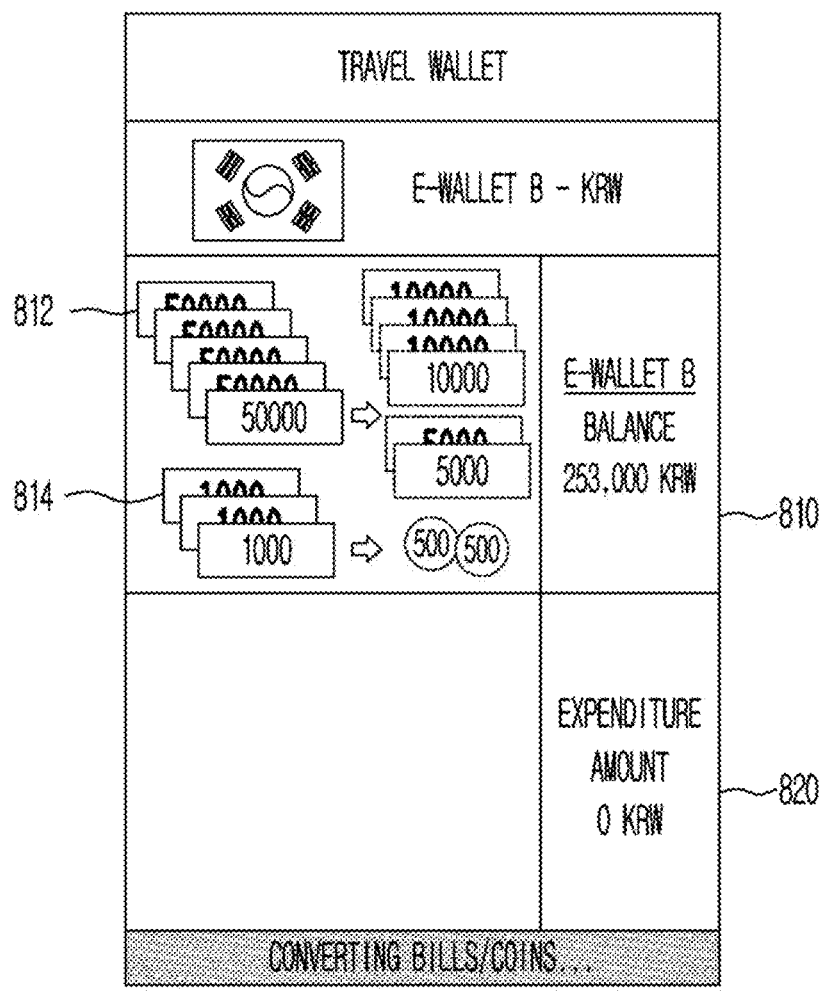

Next, as illustrated in FIG. 23, the electronic device 10 may display a GUI 1300 for converting the currency unit of the estimated balance of the electronic wallet B into sub-units in preparation for withdrawal of the amount of the transaction details identified by the electronic wallet manager 103B from the electronic wallet B. In some embodiments, the GUI 1300 includes an electronic wallet B operation area 810 and a payment operation area 820, in which the electronic wallet B operation area 810 displays the estimated balance of the electronic wallet B, and the payment operation area 820 displays an estimated payment amount (or estimated expenditure amount). In this example, the electronic wallet manager 103B is in a state of displaying the first graphic presentation of 253,000 KRW currency in the electronic wallet B operation area 810. In this state, the electronic wallet manager 103B may display a graphic presentation of converting one of the images 812 of bills with a face value of 50,000 KRW included in the first graphic presentation of the currency into four images of bills with a face value of 10,000 KRW and two images of bills with a face value of 5,000 KRW. In addition, the electronic wallet manager 103B may display a graphic presentation of converting one of the images 814 of the bills with a face value of 1,000 KRW included in the first graphic presentation of the currency into two images of coins with a face value of 500 KRW.

Figure 24:
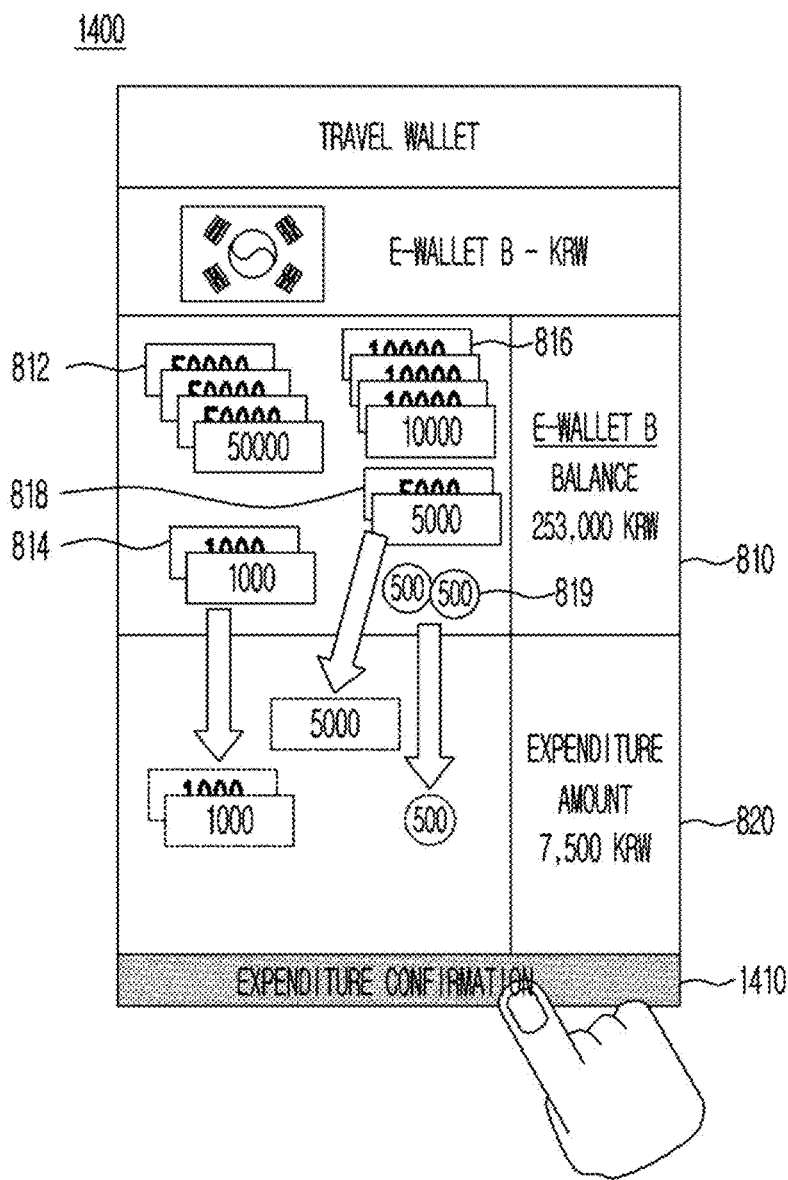

As described above, when the electronic device 10 completes a display of the graphic presentation of converting the currency unit of the estimated balance of the electronic wallet B into sub-units through the GUI 1300, as illustrated in FIG. 24, the electronic device 10 may display a GUI 1400 that displays the first graphic presentation of the currency converted into the sub-units by the electronic wallet manager 103B. Here, the electronic wallet manager 103B may be in the state of displaying the first graphic presentation of 253,000 KRW of the currency converted into the sub-units in the electronic wallet B operation area 810. That is, the first graphic presentation of the currency includes an image 812 of four bills with a face value of 50,000 KRW, an image 816 of four bills with a face value of 10,000 KRW, an image 818 of two bills with a face value of 5,000 KRW, an image 814 of two bills with a face value of 1,000 KRW, and an image 819 of two coins with a face value of 500 KRW.

In some embodiments, the user may directly touch an "expenditure confirmation" button 1410 at the bottom of the GUI 1400 to perform the transmission operation. Referring to FIG. 24, when the touch screen detects that the expenditure confirmation button 1410 is clicked, that is, when the touch screen detects a touch signal at the expenditure confirmation button 1410 portion of the GUI 1400, the electronic wallet manager 103B may display on the touch screen a second graphic presentation of automatically transmitting the currency. More specifically, the second graphic presentation of transmitting the currency may include a dynamic image of moving a portion of the currency in the electronic wallet B operation area 810 to the payment operation area 820. In other words, the second graphic presentation of transmitting the currency may include a dynamic image of moving some of the bills 814, 818 and the coins 819 in the electronic wallet B operation area 810 to the payment operation area 820. Here, the total amount of some of the bills 814, 818 and the coins 819 moved by the second graphic presentation corresponds to the expenditure amount according to the transaction details identified by the electronic wallet manager 103B through the GUI 1200.

In some embodiments, the electronic wallet manager 103B may move the expenditure amount from the electronic wallet B operation area 810 to the payment operation area 820 according to the operation signal for currency transmission detected by the touch screen, that is, according to the click touch signal of the expenditure confirmation button, and lastly, after the automatic transmission is completed, display a pop up confirmation message to ask the user whether to proceed with the withdrawal. After the user clicks the withdrawal confirmation message, the transaction processor 103A may transmit information on the amount of electronic transaction to the information processing system 20 through the communication module 105 to proceed with the electronic transaction. In other words, the operation of withdrawing the expenditure amount from the electronic wallet B may be completed in the information processing system 20. According to some embodiments, after the user clicks the withdrawal confirmation message, the transaction processor 103A may update the balance of the electronic wallet B without an electronic transaction by transmitting the information on the amount of electronic transaction to the information processing system 20 through the communication module 105.

More specifically, the electronic wallet manager 103B may automatically display the second graphic presentation of transmitting the currency according to a click touch signal of the expenditure confirmation button detected by the touch screen. That is, the electronic wallet manager 103B may automatically display a dynamic image of moving the currency from the electronic wallet B operation area 810 to the payment operation area 820, display the estimated expenditure amount corresponding to the currency moved to the payment operation area 820, and then display a pop up confirmation message to ask the user whether to withdraw. After the user clicks the confirmation message, the transaction processor 103A may transmit information on the estimated expenditure amount to the information processing system 20 through the communication module 105 to proceed with the electronic transaction. In other words, the operation of withdrawing the expenditure amount from the electronic wallet B may be completed in the information processing system 20.

For example, when the expenditure amount to be withdrawn from electronic wallet B is 7,500 KRW, upon a direct click by the user on the expenditure confirmation button in the GUI 1400, the electronic wallet manager 103B may automatically move the currency corresponding to 7,500 KRW from the electronic wallet B operation area 810 into the payment operation area 820, while also displaying a dynamic image of moving currency, and the operation of withdrawing the expenditure amount may be completed by the transaction processor 103A.

As described above, according to some embodiments of the present disclosure, the user may experience the same effect as, or a similar effect to, what would be achieved by transmitting a real currency through the graphic presentation of transmitting the currency, before finally proceeding with the transmission of the currency. Accordingly, even the users who are not familiar with the payment of costs or transfer procedure using a portable terminal such as a smart phone may more easily execute the online payment of costs or transfer procedure. In addition, the user is prevented from making, or is less likely to make, an incorrect decision or inadvertently complete an electronic transaction by a careless touch input, through the operation of a delayed graphic presentation such as displaying a corresponding graphic presentation before finally proceeding with the transmission of the currency.

Conventional devices and methods for performing an electronic transaction provide numeric display of transfer amounts and a confirmation message displayed prior to approval of the transaction. Mere numeric display of transfer amounts may confuse users unfamiliar with electronic payment systems resulting in erroneous transfer amounts and/or failure to successful complete the transaction. Also, the conventional devices and methods complete electronic transactions so rapidly that a mere confirmation message is often insufficient to prevent or sufficiently reduce errors in transaction information and/or inadvertent transactions.

However, some embodiments provide improved devices and methods for performing electronic transactions that provide specialized graphical user interfaces (GUIs) including images of real currency units (e.g., bills, coins, etc.) that may be dragged between areas representing different people and/or accounts using a touch screen. Accordingly, the improved devices and methods overcome the deficiencies of the conventional devices and methods to reduce confusion among users, particular those unfamiliar with electronic payment systems, thereby reducing transaction errors and/or failed transactions. Also, some embodiments provide improved devices and methods for performing electronic transactions that provide dynamic currency images displayed over a duration in addition to a confirmation message. Accordingly, the improved devices and methods cause a user to view transaction information over the duration, providing a longer period of time to detect an error in transaction information and/or an inadvertent transaction in comparison to the conventional devices and methods. Thus, the improved devices and methods overcome the deficiencies of the conventional devices and methods to prevent or sufficiently reduce errors in transaction information and/or inadvertent transactions.

According to some embodiments, operations described herein as being performed by the electronic device 10, the processor 103, the transaction processor 103A, the electronic wallet manager 103B, the information processing system 20 and/or the processor 203 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The apparatus described above may be implemented through a hardware component, a software component, and/or a combination of the hardware and software components. For example, the devices and components described in some embodiments, such as a processor, a controller, an arithmetic logic unit (ALU), a digital signal processor, a microcomputer, a field programmable gate array (FPGA), a programmable logic unit (PLU), a microprocessor or any device that executes and responds to the instructions, may be implemented using one or more general purpose computers or special purpose computers. A processing device may execute an OS and one or more applications executed on the OS. Further, the processing device may also access, store, operate, process, and generate data in response to the execution of software. For convenience of understanding, by referring to a situation where one processing device is used, the processing device may include a plurality of processing elements and/or a plurality of types of processing elements, as may be easily understood by those skilled in the art. For example, the processing device may include a plurality of processors or one processor and one controller. In addition, other processing configurations of a parallel processor may be further included.

The software may include a computer program, a program code, instructions, or a combination of one or more of these to configure the processing device to be operated in a particular manner, or transmit instructions to the processing device in an independent or collective manner. In order to interpret the instructions or the data through the processing device, or to provide the instructions or the data to the processing device, the software and/or the data may be embodied in any type of machine, component, physical device, computer storage medium or device. The software may be distributed over a computer system connected through a network and stored, or executed in a distributed manner. The software and the data may be stored on one or more computer-readable recording media.

The method of some embodiments may be implemented in the form of program instructions that may be executed through various computer units and recorded in a computer-readable medium. In this case, the medium may sustainably store a program executable by the computer, or may be temporarily stored in order to execute or download a program executable by the computer. In addition, the medium may be a variety of recording units or storage units in the form of combining one or a plurality of hardware, and is not limited to a medium directly connected to any computer system, and may exist in a network in a distributed manner.

Example of the medium may include magnetic media such as hard disks, floppy disks, magnetic tapes, and the like, optical recording media such as CD-ROMs, DVDs, and the like, magneto-optical media such as floptical disks and the like, and ROM, RAM, flash memory, and the like, which may store program instructions. In addition, as other examples of the medium, an app store that distributes applications, or a web page that supplies or distributes various software, or recording media or storage media which are managed through a server, and the like may be listed.

As described above, some embodiments are described through limited examples and accompanying drawings, and those skilled in the art will be able to easily perform various modifications and variations based on the above description. For example, if the techniques described herein are performed in a different order from the method described above, and/or if the component such as the system, the structure, the device, the circuit, and the like are coupled or combined in a form different than the method described above, or they are substituted or replaced with other components or equivalent technical measures, suitable results may be realized.

Accordingly, some embodiments and measures within a range equivalent to the protection range described by the disclosure also fall within the protection range described by the present disclosure.

Some embodiments are only for explaining the technology of the present disclosure, and are not intended to limit the present disclosure, and an ordinary person skilled in the related art may make various changes and modifications without departing from the scope of some embodiments. Accordingly, all equivalent technical solutions should also fall within the scope disclosed by the present disclosure.

What is claimed is:

1. A method for performing an electronic transaction, comprising:
   displaying, by an electronic device, a first graphical user interface (GUI) on a touch screen, the first GUI including a currency image of at least one of a bill or coin, the currency image corresponding to a currency amount related to a balance of an electronic wallet;
   displaying, by the electronic device, a second GUI corresponding to transmission of the currency amount according to a currency transmission signal input to the touch screen, the second GUI including a dynamic image displayed for a duration, and the dynamic image including at least one of the bill or the coin corresponding to the currency amount;
   determining, by the electronic device, an amount of an electronic transaction according to the currency transmission signal; and
   transmitting, by the electronic device, a generated signal containing information on the amount of the electronic transaction to an information processing system.

2. The method for performing the electronic transaction according to claim 1, wherein the currency transmission signal includes a touch signal received by the touch screen.

3. The method for performing the electronic transaction according to claim 2, wherein the touch signal includes at least one of a click touch signal or a drag touch signal.

4. The method for performing the electronic transaction according to claim 1, further comprising:
   displaying, by the electronic device, a third GUI corresponding to conversion of the currency amount into a different currency unit.

5. The method for performing the electronic transaction according to claim 1, further comprising:
   outputting, by the electronic device, at least one of a sound generated by a speaker, a vibration generated by a vibrator, or a visual effect on the touch screen contemporaneous with the displaying the second GUI.

6. The method for performing the electronic transaction according to claim 1, wherein the determining the amount of the electronic transaction comprises:
   calculating, by the electronic device, the amount of the electronic transaction based on a face value of the currency amount.

7. The method for performing the electronic transaction according to claim 1, further comprising:
   receiving, by the electronic device, a signal containing payment information, the payment information including an amount of income, and the currency amount being related to the payment information.

8. The method for performing the electronic transaction according to claim 1, wherein the transmitting the generated signal comprises transmitting, by the electronic device, the generated signal after expiration of the duration.

9. An electronic device for executing an electronic transaction, comprising:
   a touch screen; and
   processing circuitry configured to cause the electronic device to
      display a first graphical user interface (GUI) on the touch screen, the first GUI including a currency image of at least one of a bill or coin, the currency image corresponding to a currency amount related to a balance of an electronic wallet,
      display a second GUI corresponding to transmission of the currency amount according to a currency transmission signal input to the touch screen, the second GUI including a dynamic image displayed for a duration, and the dynamic image including at least one of the bill or the coin corresponding to the currency amount,
      determine an amount of an electronic transaction according to the currency transmission signal, and
      transmit a generated signal containing information on the amount of the electronic transaction to an information processing system.

10. The electronic device according to claim 9, wherein the currency transmission signal includes a touch signal received by the touch screen.

11. The electronic device according to claim 10, wherein the touch signal includes at least one of a click touch signal or a drag touch signal.

12. The electronic device according to claim 9, wherein the processing circuitry is configured to cause the electronic device to:
   convert the currency amount into a different currency unit; and
   display a third GUI corresponding to the conversion of the currency into the different currency unit.

13. The electronic device according to claim 9, further comprising:
   a speaker configured to generate a sound,
   wherein the processing circuitry is configured to cause the electronic device to output the sound contemporaneous with displaying the second GUI.

14. The electronic device according to claim 9, further comprising:
   a vibrator configured to generate a vibration,
   wherein the processing circuitry is configured to cause the electronic device to output the vibration contemporaneous with displaying the second GUI.

15. The electronic device according to claim 9, wherein the processing circuitry is configured to cause the electronic device to display a visual effect using the touch screen contemporaneous with displaying the second GUI.

16. The electronic device according to claim 9, wherein processing circuitry is configured to cause the electronic device to calculate the amount of the electronic transaction based on a face value of the currency amount and the currency transmission signal.

17. The electronic device according to claim 9, wherein the processing circuitry is configured to cause the electronic device to receive a signal containing payment information, the payment information including an amount of income, and the currency amount being related to the payment information.

18. A non-transitory computer-readable recording medium storing instructions that, when executed bar processing circuitry of an electronic device, cause the processing circuitry to perform operations, the operations comprising:

displaying a first graphical user interface (GUI) on a touch screen, the first GUI including a currency image of at least one of a bill or coin, the currency image corresponding to a currency amount related to a balance of an electronic wallet;

displaying a second GUI corresponding to transmission of the currency amount according to a currency transmission signal input to the touch screen, the second GUI including a dynamic image displayed for a duration, the dynamic image including at least one of the bill or the coin corresponding to the currency amount;

determining an amount of an electronic transaction according to the currency transmission signal; and transmitting a generated signal containing information on the amount of the electronic transaction to an information processing system.

\* \* \* \* \*